United States Patent [19]
Krilla et al.

[11] Patent Number: 5,104,068
[45] Date of Patent: Apr. 14, 1992

[54] APPARATUS AND METHOD FOR DE-ICING AND ANTI-ICING (AND/OR CLEANING AND RINSING) AIRCRAFT

[76] Inventors: Ronald A. Krilla, 280 White Oak Ridge Rd., Bridgewater, N.J. 08807; John R. Gaughan, III, 201 Bright Oaks Dr., Bel Air, Md. 21014

[21] Appl. No.: 565,963

[22] Filed: Aug. 10, 1990

[51] Int. Cl.$^5$ .................. B64D 15/00; B64D 15/06
[52] U.S. Cl. .................. 244/134 R; 244/134 C; 134/123
[58] Field of Search ............ 244/134 R, 134 C; 134/45, 123, 172

[56] References Cited

U.S. PATENT DOCUMENTS

| | | | |
|---|---|---|---|
| 2,708,446 | 5/1955 | Phillips | 134/123 |
| 3,243,123 | 3/1966 | Inghram et al. | 244/134 R |
| 3,533,395 | 10/1970 | Yaste | 134/45 |
| 3,612,075 | 10/1971 | Cook | 134/123 |
| 4,032,090 | 6/1977 | Thornton-Trump | 244/134 C |
| 4,378,755 | 4/1983 | Magnusson et al. | 134/123 |
| 4,634,084 | 1/1987 | Magnusson | 244/134 C |

FOREIGN PATENT DOCUMENTS

0244171 12/1965 Fed. Rep. of Germany ...... 134/123
2343389 3/1974 Fed. Rep. of Germany ... 244/134 C Primary Examiner—Joseph F. Peters, Jr.
Assistant Examiner—Linda L. Palomar
Attorney, Agent, or Firm—Leonard Bloom

[57] ABSTRACT

An apparatus for both de-icing and anti-icing an aircraft in one "pass". A pair of units are positioned above and below the aircraft. Each unit has respective nozzles oriented in one direction for dispensing de-icing fluid/air onto the aircraft as it approaches the units. Each unit further has respective nozzles oriented in an opposite direction for dispensing anti-icing fluid/air onto the aircraft as the aircraft moves away from the units. The apparatus is bi-directional so that the aircraft may approach the apparatus from either of two opposite directions. Means are provided for collecting and recycling the run-off of the de-icing and anti-icing fluids, respectively.

25 Claims, 27 Drawing Sheets

SPECIFIC AIRCRAFT DIMENSIONS (IN FEET)

| AIRCRAFT | WING-SPAN | CENTER-LINE TO WINGTIP | WING AREA IN SQ. FT. | WING ROOT TO WINGTIP | MIN. HT. AT WING ROOT | MAX. HT. AT WING ROOT | MIN. HT. AT WING-TIP | MAX. HT. AT WING-TIP | MIN. HT. AT WING-LET | MAX. HT. AT WING-LET |
|---|---|---|---|---|---|---|---|---|---|---|
| B747–100/200/300 | 195.70 | 97.90 | 5500.00 | 87.20 | 15.70 | 17.20 | 17.60 | 19.20 | | |
| –SP | 195.70 | 97.90 | 5500.00 | 87.20 | 15.90 | 16.50 | 17.20 | 19.30 | | |
| –400 | 213.00 | 106.50 | 5650.00 | 95.90 | 15.70 | 17.20 | 16.80 | 19.60 | 22.00 | 24.90 |
| B767–200 | 156.10 | 78.00 | 3050.00 | 68.90 | 13.00 | 13.00 | 16.20 | 18.20 | | |
| –300 | 156.10 | 78.00 | 3050.00 | 68.90 | 13.00 | 13.00 | 16.10 | 17.90 | | |
| B757–200 | 124.90 | 62.40 | 1951.00 | 56.20 | 12.70 | 13.20 | 15.30 | 16.10 | | |
| B737–100/200 | 93.00 | 46.50 | 980.00 | 40.30 | 8.10 | 8.70 | 10.00 | 10.20 | | |
| –300/400/500 | 94.80 | 47.40 | 980.00 | 41.20 | 8.60 | 9.10 | 10.00 | 10.20 | | |
| B727–100 | 108.00 | 54.00 | 1560.00 | 47.90 | 8.50 | 9.50 | 5.70 | 10.20 | | |
| –200 | 108.00 | 54.00 | 1560.00 | 47.90 | 8.50 | 9.50 | 4.80 | 11.40 | | |
| B707–100/200 | 130.90 | 65.40 | 2892.00 | 59.20 | 9.90 | 10.40 | 11.60 | 12.30 | | |
| –320/420 | 145.80 | 72.90 | 2892.00 | 66.80 | 10.00 | 10.50 | 12.20 | 13.10 | | |
| L1011–1/100/200 | 155.30 | 77.70 | 3456.00 | 67.90 | 15.10 | 15.50 | 16.10 | 17.90 | | |
| –500 | 164.30 | 82.20 | 3540.00 | 72.40 | 15.50 | 15.50 | 16.90 | 18.70 | | |
| DC8 –30/40 | 142.30 | 71.20 | 2758.00 | 65.00 | 10.70 | 11.30 | 15.00 | 15.90 | | |
| –50 | 142.30 | 71.20 | 2884.00 | 65.00 | 10.70 | 11.30 | 15.00 | 15.90 | | |
| –61/71 | 142.30 | 71.20 | 2884.00 | 65.00 | 10.70 | 11.40 | 14.90 | 15.70 | | |
| –62/72 | 148.30 | 74.20 | 2927.00 | 68.00 | 10.70 | 11.20 | 15.40 | 16.00 | | |
| –63/73 | 148.30 | 74.20 | 2927.00 | 68.00 | 10.70 | 11.20 | 15.30 | 15.90 | | |
| DC9 –10 | 89.40 | 44.80 | 934.00 | 39.20 | 7.50 | 7.50 | 7.20 | 7.50 | | |
| –20/30/40/50 | 93.30 | 46.70 | 1001.00 | 41.20 | 7.50 | 7.50 | 7.10 | 7.70 | | |
| MD80–81/82/83/88 | 107.90 | 53.90 | 1209.00 | 48.40 | 7.20 | 7.90 | 8.60 | 9.10 | | |
| –87 | 107.90 | 53.90 | 1209.00 | 48.40 | 7.20 | 7.20 | 8.70 | 9.20 | | |
| DC10–10 | 155.30 | 77.70 | 3550.00 | 67.90 | 15.40 | 15.90 | 14.40 | 16.20 | | |
| –30/40 | 165.30 | 82.70 | 3647.00 | 72.90 | 15.50 | 16.10 | 14.30 | 16.30 | | |
| MD11 | 170.60 | 85.20 | 3648.00 | 75.40 | 15.60 | 16.20 | 15.00 | 17.00 | 21.80 | 23.80 |

FIG. 10 A

NOZZLE GROUP PATTERNS FOR SPECIFIC AIRCRAFT (O-OPEN; X-CLOSED)
ARM 3 NOZZLE GROUPS (NG"#") MEASURED IN FEET FROM CENTERLINE (C/L)

| AIRCRAFT | ARM 1 | ARM 2 | C/L+50' NG1 | C/L+57' NG2 | C/L+65' NG3 | C/L+75' NG4 | ARM 3 C/L+80' NG5 | C/L+85' NG6 | C/L+90' NG7 | C/L+100' NG8 | C/L+110' NG9 |
|---|---|---|---|---|---|---|---|---|---|---|---|
| B747-100/200/300 | O | O | O | O | O | O | O | O | O | O | O |
| -SP | O | O | O | O | O | O | O | O | O | O | X |
| -400 | O | O | O | O | O | O | O | O | O | O | O |
| B767-200 | O | O | O | O | O | O | O | X | X | X | X |
| -300 | O | O | O | O | O | O | O | X | X | X | X |
| B757-200 | O | O | O | O | O | O | X | X | X | X | X |
| B737-100/200 | O | O | O | X | X | X | X | X | X | X | X |
| -300/400/500 | O | O | O | X | X | X | X | X | X | X | X |
| B727-100 | O | O | O | O | O | X | X | X | X | X | X |
| -200 | O | O | O | O | O | X | X | X | X | X | X |
| B707-100/200 | O | O | O | O | O | O | X | X | X | X | X |
| -320/420 | O | O | O | O | O | O | O | X | X | X | X |
| L1011-1/100/200 | O | O | O | O | O | O | O | X | X | X | X |
| -500 | O | O | O | O | O | O | O | O | X | X | X |
| DC8 -30/40 | O | O | O | O | O | O | X | X | X | X | X |
| -50 | O | O | O | O | O | O | X | X | X | X | X |
| -61/71 | O | O | O | O | O | O | X | X | X | X | X |
| -62/72 | O | O | O | O | O | O | O | X | X | X | X |
| -63/73 | O | O | O | O | O | O | O | X | X | X | X |
| DC9 -10 | O | O | O | O | O | X | X | X | X | X | X |
| -20/30/40/50 | O | O | O | O | X | X | X | X | X | X | X |
| MD80-81/82/83/88 | O | O | O | O | X | X | X | X | X | X | X |
| -87 | O | O | O | O | X | X | X | X | X | X | X |
| DC10 -10 | O | O | O | O | O | O | O | X | X | X | X |
| -30/40 | O | O | O | O | O | O | O | O | X | X | X |
| MD11 | O | O | O | O | O | O | O | O | O | X | X |

FIG. 10B

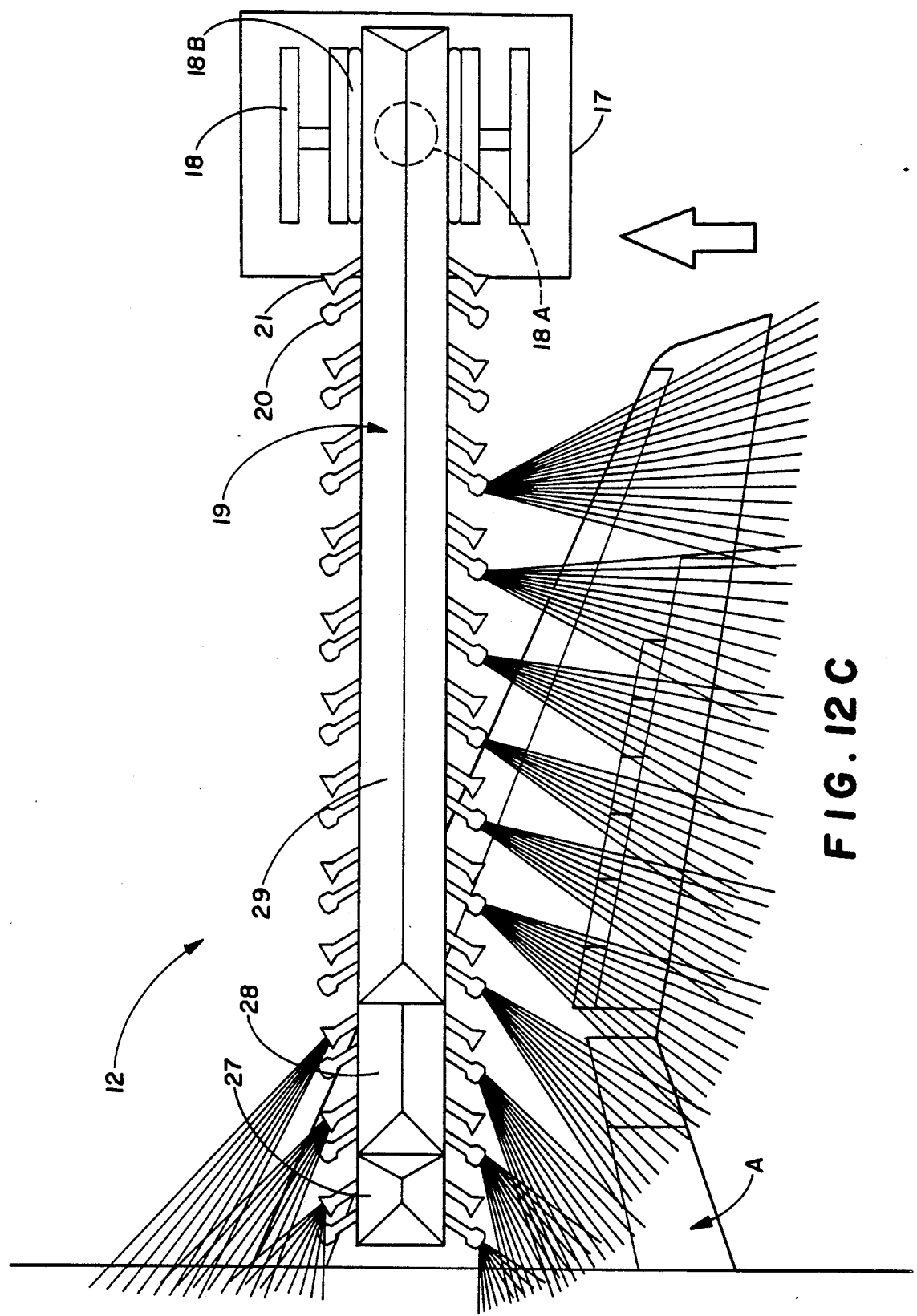

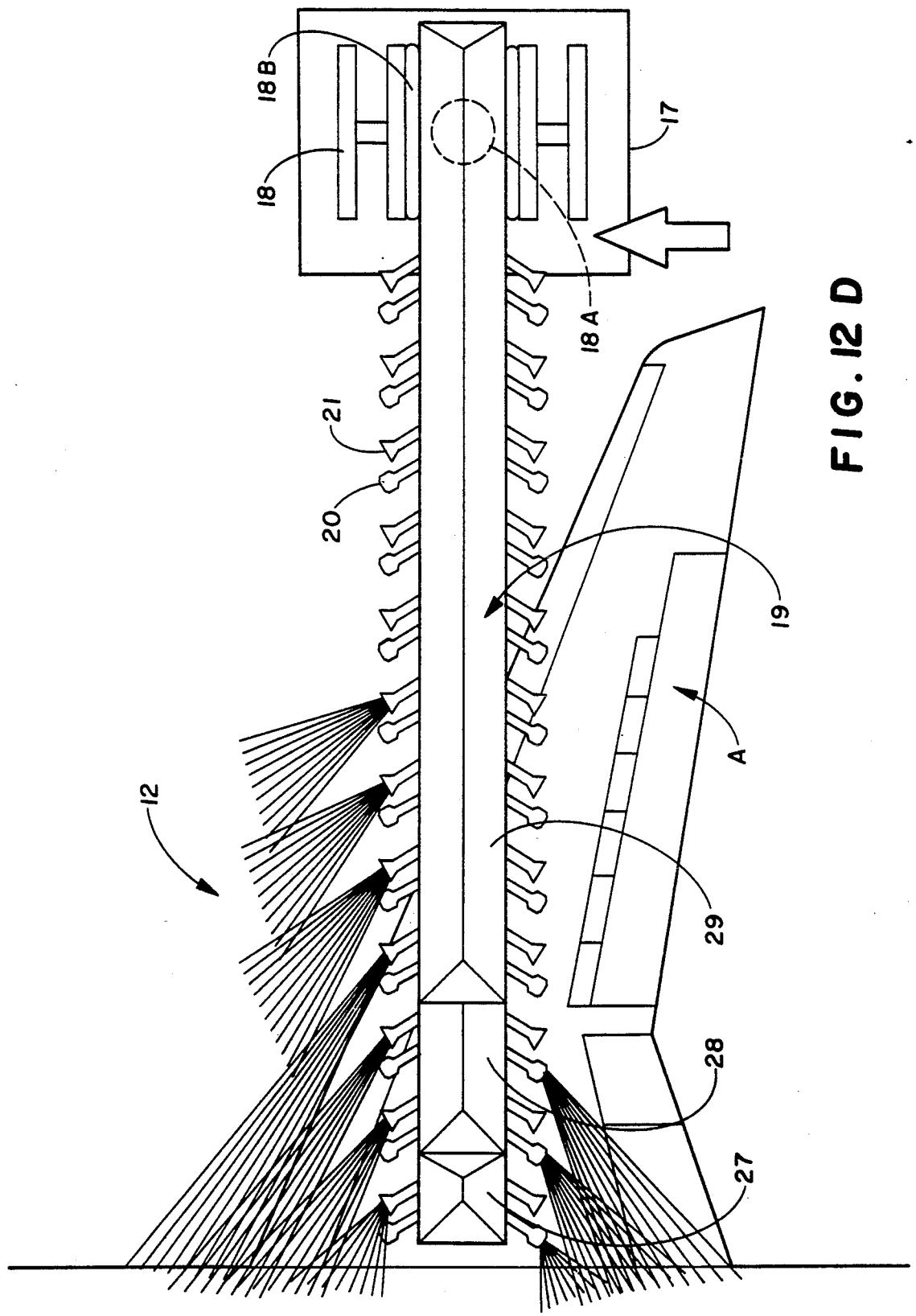

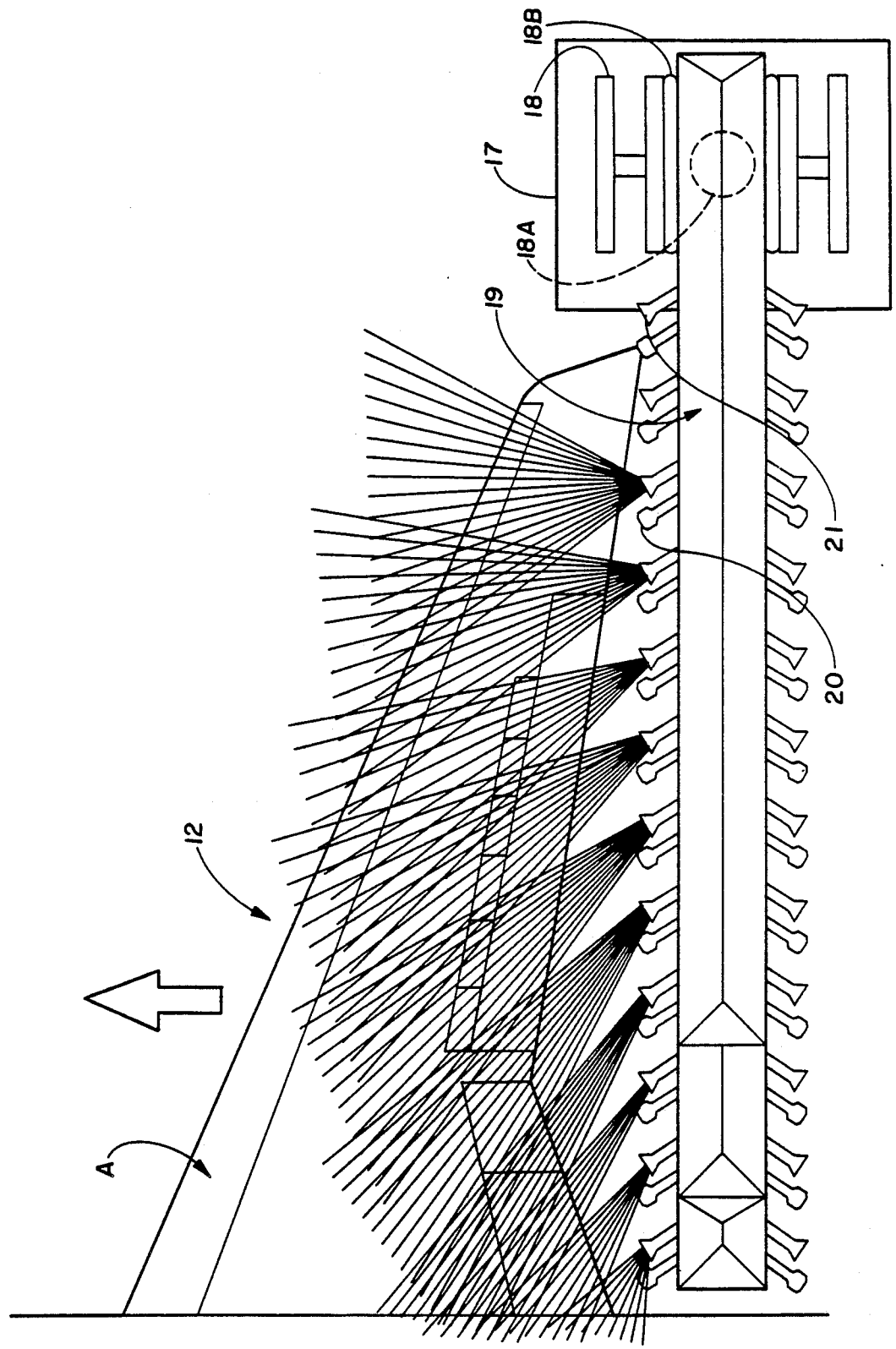

APPARATUS AND METHOD FOR DE-ICING AND ANTI-ICING (AND/OR CLEANING AND RINSING) AIRCRAFT

FIELD OF THE INVENTION

The present invention relates to an apparatus and method for the de-icing and anti-icing of aircraft (and/or cleaning and rinsing of aircraft) and in particular, to an installation (or mobile facility) at an airport which, first, accomplishes these two steps or phases in one "pass" of the aircraft relative to the installation (or mobile facility) and, second, is bidirectional so that the aircraft may approach the facility from either of two opposite directions.

BACKGROUND OF THE INVENTION

The safety of an aircraft during take-off is critically dependent upon the integrity and smoothness of the aerodynamic and control surfaces which generate the lift necessary to render an aircraft airborne at sufficient ground speeds. During adverse weather conditions—in which snow, ice and/or frost can accumulate on the aerodynamic or control surfaces of an (aircraft—it is necessary to restore and maintain the aerodynamic integrity of the aircraft to assure the safety of the passengers and crew.

The regulations concerning the restoration of aerodynamic integrity under icing and other adverse weather conditions (relating to aircraft performance and flight characteristics) were established as early as 1950 by the Civil Aeronautics Board and remain in effect today under Federal Aviation Regulations (FAR) sections 91.209, 121.629, and 135.227.

In addition, recent FAA Advisory Circulars also recognize the importance of the removal of underwing frost (as, for example, FAA Advisory Circular 20-117, Dec. 17, 1982, appendix 3, paragraph 3.b.(3)). Paragraph 3b(1) of this circular further recognizes that de-icing (i.e., the periodic removal of ice) and anti-icing (i.e., preventing ice formation) are distinct and separate components in the certification of aircraft for flight in icing and other adverse weather conditions. The Federal Aviation Administration, therefore, recognizes the importance of addressing each of these issues when considering flight safety in icing and other adverse weather conditions.

Moreover, it is necessary to carefully consider the various types of ground icing which can affect an aircraft in different ways by the formation of stronger or weaker bonding of the ice layer to the surfaces of the aircraft. Each of these considerations can require different application techniques in order to assure the safe, complete, efficient and economical removal of each type of ice.

There are three major types or groups of ground icing deposits or formations.

The first group ("Group I") is produced by the sublimation of water into ice while omitting the vapor phase. Group I includes hard (crystalline) ice, glaze ice and rime ice. Hard (crystalline) ice is formed when oncoming masses of warm air interact with the surface of objects that are already at a lower sub-zero temperature. Glaze ice is formed in severe frost as a result of the oversaturation of air with water vapor. Rime ice is formed in calm, clear weather by the emission of heat from a surface which is at a lower sub-zero temperature than the surrounding air. Air near these surfaces is cooled to a point in which the inherent water vapor quickly reaches a saturation level and is converted directly into ice at the coldest point which is the surface-to-air interface. These three types of Group I deposits are all snow-like in appearance, unstable, and of low density; thus may be easily removed from the airfoil and other aircraft surfaces.

The second group of ground icing types ("Group II") results from the presence of supercooled water in the atmosphere. Under these conditions, ice is formed as a result of the crystallization on the aerodynamic and control surfaces of supercooled droplets of rain, mist or drizzle. Air temperatures of approximately 0° C. are usually present with this type of ice formation on the ground. The ice deposits of Group II bond much more firmly to the aerodynamic and control surfaces of the aircraft (than the sublimated deposits of Group I) and may attain very large dimensions.

The third group of ground icing types ("Group III") includes ice formation produced by "ordinary non-supercooled" water formed on the aerodynamic and control surfaces of the aircraft. Ordinary non-supercooled water may include (but is not limited to) rain, wet snow, precipitated fog droplets, and water vapor condensate. Their outward appearance may be similar to Group I and Group II type ice deposits; however, Group III type ice deposits form a solid bond with the aerodynamic and control surfaces of the aircraft (as referred to by Dr. O. K. Trunov, *Aviation Week*, June 1985, pages 17–21).

It would be very desirable and important, therefore, to have an apparatus and a method which can modify fluid and fluid/air application procedures necessary to de-ice and anti-ice aircraft under the various conditions which lead to the three different ice group formations. This would assure the restoration of proper flight characteristics in the most efficient and cost effective manner possible.

The existing regulations which govern these proper flight characteristics (and which are specified hereinbefore) are based on the principles and regulations which are collectively known in the airline industry as the "Clean Aircraft Concept". This concept is based on Federal Aviation Regulation 91.209(a)(2), which states that:

> "No pilot may take off an airplane that has . . . snow or ice adhering to the wings, or stabilizing, or control surfaces . . . ".

The principles known as the Clean Aircraft Concept acknowledge the known degradation in aircraft performance and changes of aircraft flight characteristics when ice formations of any type or group are present. Under normal conditions, the airflow over a wing smoothly follows the shape of the airfoil, thereby providing the "lift". The lift is defined as the force generated by the flow of air over a lifting surface. The lift varies directly with the "angle of attack", which is defined as the inclination of the fuselage reference plane ("FRP") to the oncoming airflow. As the angle of attack increases, it becomes more and more difficult for the air to follow the airfoil shape; and the air begins separating from the wing. When the flow of air is fully separated from the wing, the wing is considered to be "stalled"; that is, the lifting capability of the wing is fully degraded. The "lift coefficient", which is defined as a non-dimensional parameter that allows the comparison of the lifting ability independent of size or speed, declines sharply.

The lift coefficient can be described by the equation:

$$C_L = K \frac{L}{A_W(S)^2}$$

where:
$C_L$ = lift coefficient
K = a constant
L = lift
$A_W$ = wing area
S = speed.

This equation shows that anything which affects the wing area will have an inversely-proportionate impact on the lift coefficient. The formation of ice or other materials which increase surface roughness impacts upon the effective wing area. Again, in turn, the normal variation of lift with the angle of attack can be significantly and adversely altered by the presence of ice or other contamination. Specifically, the effect of ice or other material contamination of wing surfaces is to reduce the maximum lift capability of the wing and to cause stall to occur at a lower angle of attack. In other words, a contaminated wing could cause an aircraft to stall at an otherwise normal departure angle from the runway.

Ice or other materials which contaminate the wing surface also increases the "drag" or "drag coefficient" (herein defined as the retarding force exerted on a moving body by a fluid medium). It does so by increasing surface roughness and disturbing the smooth airflow necessary for lift over the airfoil surface. Even small accumulations can have a dramatic impact on flight characteristics. As stated in the FAA Advisory Circular 20-117 (dated Dec. 17, 1982):

"Wind tunnel and flight tests indicate that ice, frost, or snow formations on the leading edge and upper surface of a wing, having a thickness and surface roughness similar to medium or coarse sandpaper, can reduce wing lift by as much as 30 percent and increase drag by 40 percent.".

It will be appreciated that the degradation of aircraft performance and flight characteristics due to an increase in the drag coefficient have an impact similar to the reduction of the lift coefficient (as discussed hereinbefore) and thus will not be repeated herein (reference being made to Aircraft Ground De-icing Conference Proceedings, Sept. 20-22, 1988, R. E. Brumby, pp. 47-66).

Even under ideal weather conditions, the accumulation of dirt, sand, insects, airborne particles, dirt entrained oil droplets, and surface irregularities which result from high speed impact of minute particles can all adversely affect the lift coefficient on an airfoil surface. Thus, it is also necessary to regularly wash the aircraft to maintain optimal flight characteristics (as well as enhancing the appearance of the aircraft).

Further, the misapplication of de-icing and/or anti-icing fluids—especially recently developed fluids of higher viscosities (including those still in research and development)—may cause ripple effects on the wing surface during take-off; and as a result, drag forces are increased, and the lift coefficient of the airfoil is reduced. Prior and current cleaning, de-icing and anti-icing technologies (to be described hereinafter) delivering these new generation fluids (also to be described hereinafter) to maintain the manufacturer's design specifications on viscosity and coverage are, nevertheless, inefficient and uneconomical.

Early aircraft precluded operations in icing or weather conditions due to a lack of airborne navigational reliability; therefore, icing concerns were a moot point. As avionics improved, however, weather conditions became more of an operational factor.

The use of hangers, wing and/or component covers to avoid exposure to the elements lessened but did not eliminate the work needed to remove ice, snow or frost. At first, the use of simple tools for the direct removal of accumulations of ice, wet snow and frost from aircraft surfaces included brooms, brushes, ropes, squeegees, fire hoses and other devices. Albeit functional, these initial methods were crude, time consuming and inefficient; and as the size of the aircraft increased, these manual methods became totally unsatisfactory.

Moreover, significant drawbacks are inherent in the use of these simple tools and devices. First, care has to be exercised when using these tools so that the aircraft skin and other critical components are not inadvertently damaged during removal operations. Second, these methods are generally useful only during clear, cold weather with dry snow or frost accumulations. As the severity of the weather increases, the continual precipitation (in the form of wet snow, freezing rain or sleet, etc.) becomes a definite factor in the preparation of the aircraft; and thus the mere removal is not sufficient to maintain the Clean Aircraft Concept necessary to approve the aircraft for take-off. In addition, the introduction of larger aircraft, as well as the rapid increase in scheduled flights, further aggravated the existing problem.

Basically, the problem is reliable scheduling of aircraft, fast "turn around", and efficient use of facilities and manpower, consonant with the highest standards of aircraft safety under inclement weather conditions.

In an effort to alleviate this problem, freezing point depressant ("FPD") fluids consisting substantially of organic alcohols were introduced quite some time ago (approximately during the late 1940's, early 50's) primarily for de-icing purposes. FPD fluids take advantage of the eutectic point phenomenon of certain organic solvents. In this phenomenon, two completely miscible solvents can be combined in varying proportions at constant pressure to lower the freezing point of the mixture below the freezing point of either component, since each solvent interferes with the crystallization of the other solvent at their respective normal freezing points. The components of all commercially available FPD fluids are of the ethylene glycol and propylene glycol family. The ethylene glycol fluids are designated "Type I", and the propylene glycol fluids are designated "Type II". Exact formulations (including corrosion inhibitors, wetting agents and more recently viscosity enhancing agents) are proprietary to the manufacturer. However, all of these FPD fluids exhibit this eutectic point phenomenon when mixed with water. It is generally accepted from experimental and actual operating data that the minimum freezing point occurs when the mixture is approximately sixty percent (60%) glycol and forty percent (40%) water. The addition of either water or glycol at this point will raise the minimum freezing point.

The application of aircraft de-icing fluid ("ADF") and/or FPD fluids to the aircraft surface can utilize anything from very simple manual techniques (mops, buckets, brushes, and hand pumps) to more elaborate mobile platform-mounted spraying equipment operated by ground support personnel.

The most common equipment presently utilized for aircraft de-icing is based on technology that is approximately thirty (30) years old. Basically, the de-icing equipment is mounted on a truck chassis and requires two operators. Examples of this type of two-man mobile de-icing equipment are the model D-40-D truck manufactured by the Ted Trump Company (and capable of delivering up to 1800 gallons of FPD mixture) and the truck models TM-1800 and LA-100 manufactured by the Airline Equipment Division of the FMC Corporation of Orlando, Fla. (and capable of delivering 1800 and 1000 gallons of FPD mixture), respectively.

The procedure is as follows: Once the truck is properly positioned in relation to the aircraft, a boom device operates from the top of the truck, thereby spraying a hot liquid onto the aircraft to de-ice (or clean). The truck is repositioned around the aircraft as each section is de-iced (or cleaned) until the entire aircraft has been completed. When necessary, the truck makes a second circuit of the aircraft to apply another coating of the FPD fluid for anti-icing protection.

While functional, this existing procedure is inefficient in terms of the investment in specialized equipment, manpower requirements, time, glycol consumed, and the effects on the environment. To de-ice and anti-ice a narrow-body aircraft (e.g., a Boeing 727 or DC-9) a typical two-man team under adverse weather conditions takes approximately 10 to 12 minutes, and the operation can consume in excess of 1000 gallons of glycol at a cost of over $3,000.00. The equipment (which is of limited use) represents an investment of $200,000 or more per unit and is restricted to de-icing and anti-icing aircraft with occasional maintenance usage of the boom assembly for access to the upper aircraft components.

The additional processing time per aircraft necessary for this type of operation during adverse conditions extends the scheduled flight time for passengers. In addition, de-icing personnel are frequently drawn from other essential functions. This can cause further delays as original tasks become understaffed. As delays accumulate, the flight crew can exceed their allowable safe flight time as established by the FAA. Once allowable flight time is exceeded, the original flight crew must be replaced by another flight crew which only further adds to the delays and expense of operations. As the first flight for an aircraft is delayed, its remaining schedule must be adjusted. Thus, each delay cascades through an airline's schedule and accumulates added costs and customer dissatisfaction until the adverse weather conditions subside.

Finally, most de-icing is performed at the gate. At this location, the amount of ethylene glycol used is excessive and wasteful. The excess fluid at this location is allowed to flow into the storm drain systems of the airport. Thus, this material is not only lost for recycling purposes, but it also adds a toxic pollutant to the environment.

In an effort to solve these problems and disadvantages of long standing, the patented prior art has suggested various devices and arrangements which utilize towers that include booms and systems for glycol recovery and re-use. These devices and arrangements, of which we are aware, are represented by the following U.S. Letters Patents:

| Inventor(s) | U.S. Pat. No. |
| --- | --- |
| Yaste | 3,533,395 |
| Cook | 3,612,075 |
| Arato | 3,835,498 |
| Magnusson et al | 4,378,755 |
| Magnusson | 4,634,084. |

For example, U.S. Pat. No. 4,378,755 to Magnusson et al discloses a pair of spaced-apart portals through which the aircraft passes. Each portal supports a multiple of specially-designed conduits which is provided with a plurality of nozzles in the plane of the conduit. One of the conduits (intended to service the largest aircraft) is fixed. All of the other conduits are intended for respective aircraft (to conform to the profile of the respective aircraft) and are raised and lowered as required. Thus the system is inflexible and/or inefficient for other present aircraft or for future aircraft. An underground conduit has upwardly-directed nozzles to service the under surfaces of the aircraft. All of the nozzles are controlled by sensors. Since the portals are spaced apart, the first portal sprays hot water onto the aircraft for washing off the snow and ice. After the snow and ice is thus removed from the aircraft, the aircraft goes through a second portal; and this second portal showers a concentrated glycol onto the aircraft to prevent a new coating of snow and ice until the aircraft is airborne.

While these prior art devices and arrangements are intended to improve efficiency in terms of manpower and glycol consumption, each nonetheless still includes various drawbacks that have frustrated their widespread acceptance and commercialization.

In particular, none of the prior art devices or arrangements (of which we are aware) permits the aircraft to be both de-iced and anti-iced, conveniently and efficiently, and in one "pass" through a single integrated apparatus, thereby conserving manpower and glycol consumption. None of the prior art devices and arrangements is bidirectional, meaning that the aircraft may not enter into the apparatus from one of two opposite directions. None of the prior art devices or arrangements is capable of quickly and easily modifying the fluid(s) and fluid(s)-/air application procedures thereof, thereby efficiently de-icing and anti-icing an aircraft under the different ice group formations experienced under various adverse weather conditions. None of the prior art devices or arrangements is capable of consistently and efficiently applying the de-icing and/or anti-icing fluid(s) of higher viscosities in such a manner so as to maintain the design specifications on viscosity and coverage that are necessary to prevent the ripple effects on the wing surface. None of the prior art devices or arrangements is capable of also cleaning and/or rinsing the aircraft—in addition to de-icing and anti-icing the aircraft—and in one "pass" of the aircraft through a bidirectional single integrated apparatus. None of the prior art devices and/or arrangements provides an efficient means by which the underside of the aircraft (including the underwing surfaces thereof) may be simultaneously de-iced and anti-iced (and/or cleaned and rinsed) and, again, in one "pass" of the aircraft through a bidirectional single integrated apparatus.

Accordingly, it will be appreciated that there exists a long-standing need for an apparatus (and a method) for de-icing and anti-icing (and/or cleaning and rinsing) a wide variety of aircraft, and wherein the apparatus has a relatively-low capital investment, is efficient, conserves expensive glycols, is rugged and reliable, easy to service and to maintain, saves manpower and time, protects the environment, allows aircraft of all types to be quickly de-iced and anti-iced, and (most importantly) assures the highest margin of aircraft safety under adverse weather conditions while maintaining flight schedules.

SUMMARY OF THE INVENTION

It is the primary object of the present invention to provide the highest margin of safety to an aircraft's performance during operations under adverse weather conditions.

Accordingly, in achieving this objective, the present invention constitutes an efficient automated system for the cost-effective delivery of various de-icing and anti-icing (and/or cleaning and rinsing) fluids, wherein the system is flexible and adjustable to accommodate a wide variety of aircraft under various weather conditions.

With this in mind, it is an object of the present invention to provide a single integrated apparatus for applying various fluids for de-icing and anti-icing (and/or cleaning and rinsing) an aircraft in a two-step one "pass" operation through the single integrated apparatus.

It is another object of the present invention to provide such an apparatus and method that is bi-directional, so that the aircraft may pass through the apparatus from either of two opposite directions, thereby providing maximum flexibility at an airport.

It is a further object of the present invention to provide such an apparatus and method that is capable of conveniently modifying the fluid(s) and fluid(s)/air application procedures thereof that are necessary to de-ice and anti-ice (and/or clean and rinse) the aircraft under various conditions.

It is a still further object of the present invention to provide such an apparatus and method that is capable of consistently and efficiently applying de-icing and anti-icing fluids of higher viscosities, so as to maintain the design specifications relative to viscosity and coverage that are necessary to provide satisfactory anti-ice protection to the wing and aircraft surfaces.

It is a yet still further object of the present invention to provide such an apparatus and method that is simultaneously capable of de-icing and anti-icing (and/or cleaning and rinsing) both the underside and the topside of the aircraft and, again, in one "pass" of the aircraft through the single integrated apparatus.

The apparatus and method of the present invention concurrently delivers respective fluid pressure mixtures for deicing and anti-icing (and/or cleaning and rinsing) to minimize aircraft ground time under anticipated adverse weather conditions. The one-pass two-step system of the present invention combines two separate but related functions of de-icing and anti-icing into a two-step/one-pass operation, as the aircraft moves through the single integrated apparatus, for maximum economy and efficiency.

Moreover, the present invention defines a central location at an airport for de-icing and anti-icing an aircraft just prior to the flight of the aircraft. While a fixed installation has been disclosed herein, however, it will be appreciated that the teachings of the present invention are equally applicable to a transportable or mobile facility at an airport.

The bi-directional apparatus of the present invention provides for the concurrent de-icing and anti-icing (and/or cleansing and rinsing) of aircraft by applying appropriate fluids and/or mixture of fluids and/or mixture of fluids and air, each of which is designed for a particular purpose, and each of which can be heated. These fluids, fluid mixtures, and/or mixtures of fluids and air are delivered to the surfaces of the aircraft as the aircraft moves through the bidirectional apparatus in one "pass". As a result, the aircraft "holdover" time—which is defined as the maximum allowable ground time (after de-icing and anti-icing) for safe take-off of the aircraft under adverse (weather conditions—is substantially increased.

The present invention delivers several types of pressurized fluid mixtures and takes advantage of the properties of current and anticipated de-icing and anti-icing fluids which may be required by airline regulatory agencies. The de-icing and anti-icing fluids are delivered with a low shear means which may include (but is not limited to) specially-designed nozzles and pumps which retain fluid viscosity, and which (in turn) enhance an aircraft's safe ground holdover time.

In carrying out the teachings of the present invention, a pair of multiple-section articulatable booms are provided which extend horizontally over the respective fuselage and wings of the aircraft. These articulatable booms include a plurality of arms which are pivotably connected to each other. With this structure, the articulatable booms arms are adjustable both in height and orientation to accommodate the various configurations of private and commercial aircraft (i.e. narrow/widebody, "T" tail, etc.). The various configurations are achieved by the use of a combination of hydraulically or electrically-operated worm gears and linear actuators within the articulatable booms to achieve a safe clearance from aircraft control and lift surfaces.

The articulatable booms carry respective banks of low and high-pressure nozzles interspersed with respect to each other and arranged in respective nozzle groups of predetermined length along the respective booms for performing the de-icing and anti-icing (and/or cleaning and rinsing) operations, respectively. The high-pressure nozzles are for de-icing (or cleaning) and the low-pressure nozzles are for anti-icing (or rinsing). These nozzle groups correspond to the various aircraft wingspans and other configurations and are sequenced or cycled, so that only the nozzles necessary for proper coverage are operated during each cycle. Preferably, these nozzles are of the quick-disconnect type for easy maintenance and repair.

In accordance with the teachings of the present invention, a single integrated apparatus is disclosed for both de-icing and anti-icing (and/or cleaning and rinsing) an aircraft in one pass of the aircraft through the apparatus. The apparatus includes respective first nozzle banks disposed along the forward portion of the apparatus for dispensing a first de-icing pressurized fluid mixture onto the aircraft as the aircraft enters the apparatus. The apparatus further includes respective second nozzle banks disposed along the rearward portion of the apparatus for dispensing a second anti-icing pressurized fluid mixture onto the aircraft as the aircraft moves away from the apparatus. The first nozzle banks are directed downwardly and forwardly of the apparatus, and the second nozzles are directed downward and rearwardly of the apparatus. Respective sources of de-icing fluid mixtures and anti-icing fluid mixtures are provided, and pressurized means are further provided for piping the respective pressurized fluid mixtures from the respective sources to the first and second nozzles, respectively. As a result, the aircraft may be both de-iced and anti-iced in one pass through the single integrated apparatus.

Preferably, the first and second nozzle banks are arranged in groups of nozzles and are selectively activated to conserve fluids, yet provide the desired coverage.

The de-icing fluid mixture may include one or more of the following constituents: glycol, pressurized and/or heated air, water, and any desired additive.

In a preferred embodiment, the first nozzle banks as well as the second nozzle banks are both mounted forwardly and rearwardly of the apparatus, and are interspersed with each other, so that the apparatus is bi-directional. As a result, not only is the aircraft de-iced and anti-iced (and/or cleaned or rinsed) in one pass through the apparatus for maximum efficiency; but, moreover, the aircraft may approach the apparatus from either direction, thereby providing increased flexibility in airport operations (especially under inclement weather conditions) yet maintaining the highest standards of aviation safety.

In another preferred embodiment, respective banks of first and second nozzles are disposed in the apparatus both above and below the aircraft, so that the underwing of the aircraft is also de-iced (and/or cleaned) along with the upper surfaces of the wing and fuselage while still preserving the bi-directional feature of the apparatus.

Viewed in one aspect, the present invention provides a bi-directional apparatus for de-icing and anti-icing an aircraft in a two-step one-pass operation. The apparatus includes at least one boom having a forward portion and a rearward portion. High-pressure nozzles are mounted on both the forward and rearward portions of the boom, and low pressure nozzles are mounted on both the forward and rearward portions of the boom (and are interspersed with the high-pressure nozzles thereon). A first source of a pressurized fluid mixture for de-icing the aircraft is provided, and a second source of a pressurized fluid mixture for anti-icing the aircraft is further provided. First means are provided for selectively connecting the first source to the first nozzles, and second means are provided for selectively connecting the second source to the second nozzles.

Viewed in another aspect, the present invention provides a single integrated apparatus for de-icing and anti-icing an aircraft, wherein first high-pressure nozzles are provided (and are directed downwardly and forwardly of the apparatus) for spraying a first pressurized fluid mixture including a de-icing fluid on the aircraft as the aircraft enters into the apparatus. Second low-pressure nozzles are provided (and are directed downwardly and rearwardly of the apparatus) for spraying a second pressurized fluid mixture including an anti-icing fluid on the aircraft as the aircraft leaves the apparatus. As a result, the aircraft may be both de-iced and anti-iced, respectively, in one "pass" of the aircraft relative to the single integrated apparatus. Means are provided for selectively cycling respective portions of the first and second nozzles, thereby conserving the de-icing and anti-icing fluids as the aircraft is progressively de-iced and anti-iced by the apparatus.

Viewed in yet another aspect, the present invention provides (in an apparatus for de-icing and anti-icing an aircraft) the combination of respective substantially-horizontal articulatable booms disposed over the wings and at least a portion of the fuselage of the aircraft and on respective sides of the aircraft. A means is provided for raising and lowering the booms relative to the aircraft, thereby accommodating various aircraft heights. Each boom has a plurality of arms pivotably mounted to each other, such that the booms may be readily adjusted to accommodate various aircraft configurations. First high-pressure nozzles are carried on each boom for spraying a first pressurized fluid mixture including a de-icing fluid onto the aircraft, and second low-pressure nozzles are carried on each boom for spraying a second pressurized fluid mixture including an anti-icing fluid onto the aircraft. The first and second nozzles are arranged in respective nozzle groups including a first nozzle group and a second nozzle group; and means are provided for selectively actuating the nozzles in each nozzle group depending upon the wingspan of the aircraft being serviced, so that only the nozzles necessary for proper coverage are operated, thereby conserving the de-icing and anti-icing fluids.

FIG. 16 is a further perspective view, corresponding to a portion of FIG. 1, but showing the storage tanks for the fluids used with the apparatus and method of the present invention, the underground conduits to the equipment house, and the underground conduits to one of the articulatable booms (the conduits being shown schematically for ease of illustration).

These and other objects and advantages of the present invention will become more readily apparent from a reading of the following description when taken in conjunction with the drawings.

DESCRIPTION OF THE DRAWINGS

FIG. 10A is a table listing the physical characteristics (such as wingspan) of various aircraft that may be both de-iced and anti-iced (and/or cleaned and rinsed) using the apparatus and method of the present invention.

FIG. 10B is a table listing (for the aircraft listed in the FIG. 10A table) the actuation of the various nozzles in the respective groups of nozzles in the respective arms of one of the articulatable booms used in the apparatus of the present invention.

FIG. 12C is a further top plan view, showing the wing passing underneath the articulatable boom; such that while the de-icing high-pressure nozzles on the forward portion of the boom are still actuated, the anti-icing low-pressure nozzles on the rearward portion of the boom begin to be actuated, selectively, for anti-icing that portion of the wing and part of the fuselage (that was previously de-iced) as the aircraft is further towed through the apparatus.

FIG. 12D is a further top plan view, showing the continuing sequence of de-icing and anti-icing the aircraft, progressively, as the aircraft passes through the apparatus, the view illustrating how more of the anti-icing nozzles comes "on stream" as the previous de-icing process approaches completion.

FIG. 12E is a still further top plan view, showing the completion of the de-icing step and the substantial application of the anti-icing step.

DESCRIPTION OF PREFERRED EMBODIMENTS

Figure 1:
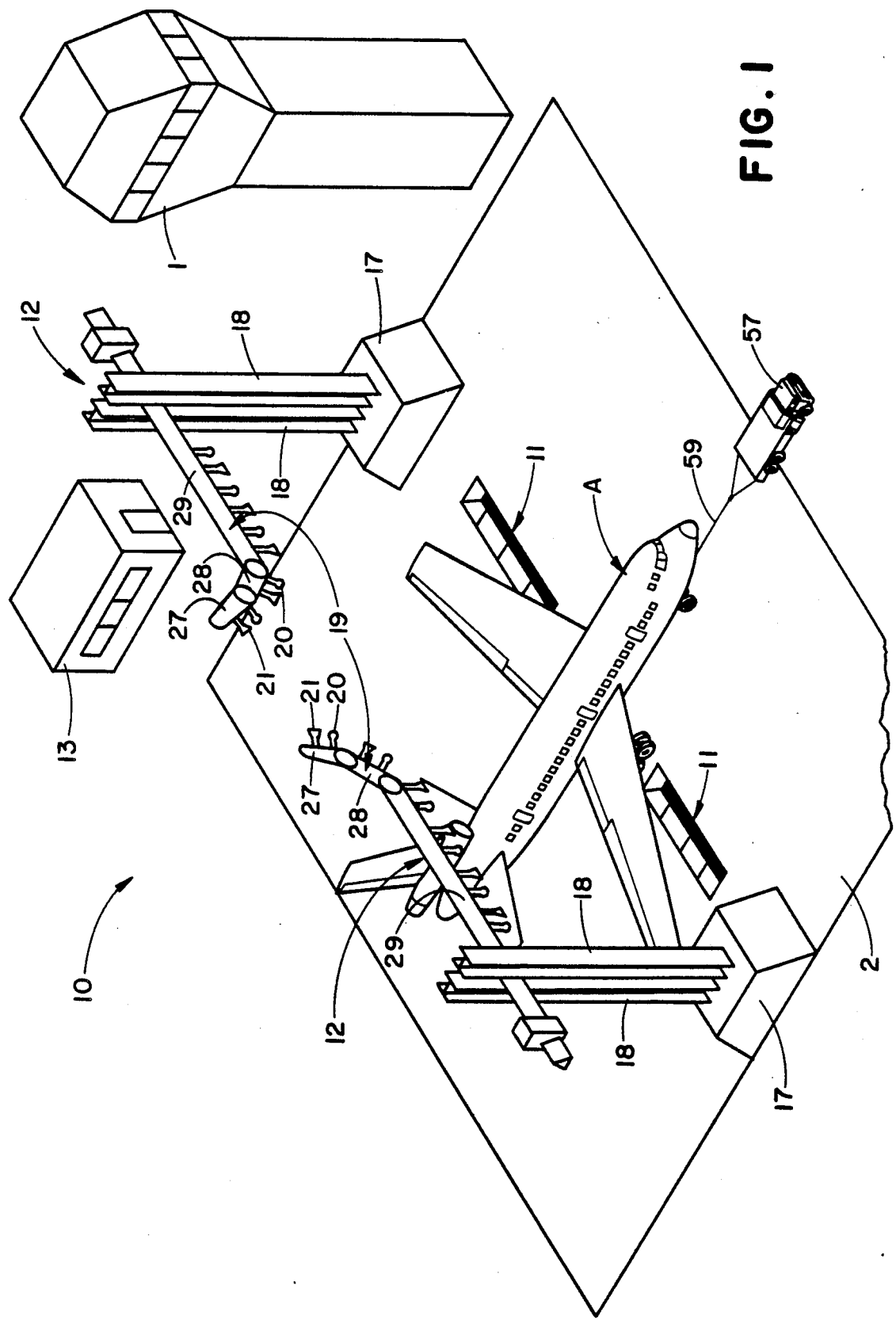
FIG. 1 is a perspective view of the overall apparatus of the present invention, showing a typical aircraft being towed through the apparatus for both de-icing and anti-icing (and/or cleaning and rinsing) the aircraft in one "pass" through the apparatus (and from either direction thereof).

The apparatus and method of the present invention facilitates the efficient de-icing and anti-icing (and/or cleaning and rinsing) of an aircraft—and preferably at a (centralized location at an airport—to allow an aircraft to depart from the gate on schedule and fully-loaded. At an appropriate time, the aircraft is towed (or otherwise moved) at a predetermined rate through the apparatus. While moving through the apparatus, the aircraft is sprayed by respective pressurized fluid mixtures to de-ice and anti-ice (and/or clean and rinse) the desired respective surfaces of the aircraft.

The pressurized fluid mixtures utilized to de-ice the aircraft include a mixture of heated air, water, glycol, solvent or additives, or any combination thereof. Preferably, however, a mixture of pressurized air and water is utilized for de-icing. The fluid(s) and/or air utilized to anti-ice the aircraft include glycol, water and air or any combination thereof. Preferably, a mixture of pressurized glycol and water is utilized for anti-icing.

Other usable fluids include the Type I and Type II fluids and cleaning solvents (such as detergents). For example, the recycled Type I/Type II fluids are used in de-icing to prevent the freeze up of the system.

The fluids, etc., may either be heated and/or compressed, as desired, to coat the surfaces. Preferably, the fluid(s)/air mixture(s) utilized for de-icing operations will be dispensed under high pressure, and the fluid(s)/air mixture(s) utilized for anti-icing operations will be dispensed under low pressure.

It is noted herein that while glycol (ethylene glycol) will be specified throughout this description, other types of fluids having a low shear viscosity may be substituted therefor or mixed therewith. This includes the newly-developed Type II fluids, which use propylene glycol and a polymer to increase the viscosity of the fluids. That significantly improves the dilution resistance of the Type II fluids and therefore lengthens the aircraft's ground holding time during icing conditions.

The use of low pressure/low shear is necessary to deliver Type II fluids with its intended properties. Otherwise, the cross-linked polymers will be sheared, breaking the copolymer into smaller chains molecules and thereby reducing viscosity. As a result, the fluid will lose contact with the aircraft before the desired time. It is noted that the shear force must come from the wind as the aircraft is taking off on the runway and not before. The protection is desired prior to take-off, but the extra drag presented by the fluids is not desirable to have under normal flying conditions. Thus, the high viscosity fluids, therefore, should not be broken down by handling or pumping prior to take-off but only by the shear forces generated by the air as it passes over the wing during take-off.

The various ratios of the pressurized fluid mixtures (including water, air, temperature and percentages of recycled Type I fluid) may be varied, as needed, according to the various weather conditions that may be encountered, such as light freezing rain, rime ice, or "clear" ice, the latter constituting a severe icing condition.

In less severe icing conditions (i.e., light freezing rain) the application will depend upon the exposure time of the aircraft. In such conditions, the de-icing fluid will be comprised of almost all compressed air and very little water in order to achieve a de-icing (and cleaning) action. The water is mixed in for its abrasive action and to provide a carrier for the air.

Rime ice (constituting a sort of milky ice) will require the input of slightly higher quantities of water and, even possibly, anti-freeze.

In the most severe conditions of "clear" ice, typical outside temperatures may be 20° F. or lower. The aircraft may have up to one-quarter inch of ice on the wing. In such conditions, more water and more antifreeze will be utilized at higher temperatures. Use of the Type I/Type II anti-freeze is employed to prevent water from the first de-icing step from freezing on the wing of the aircraft.

With this in mind, and with reference to FIG. 1, the apparatus 10 of the present invention generally includes an apron or tarmac 2, a pair of lower units 11 mounted in the apron 2 for the underside of an aircraft, and a pair of upper units 12 for de-icing and anti-icing (and/or cleaning and rinsing) the topside of the aircraft. The lower units 11 are desirable for de-icing the underwing of the aircraft. Preferably the fluids, pumps and other equipment are contained in a central location, such as an independent building 13. If desired, however, the fluid sources, pumps and other equipment may be included on the units 11 and 12 directly.

One or more observation towers 1 are positioned on either side of the apron (or tarmac) 2 and may be utilized by qualified on-site operator(s) to direct and control the de-icing and anti-icing (and/or cleaning and rinsing) operations of the apparatus 10. Alternatively, the operator(s) may be positioned directly on the upper units 12. Also, airline designated observer(s) will approve each aircraft's condition and act as on-site representative(s) for their respective airlines.

Figure 2:
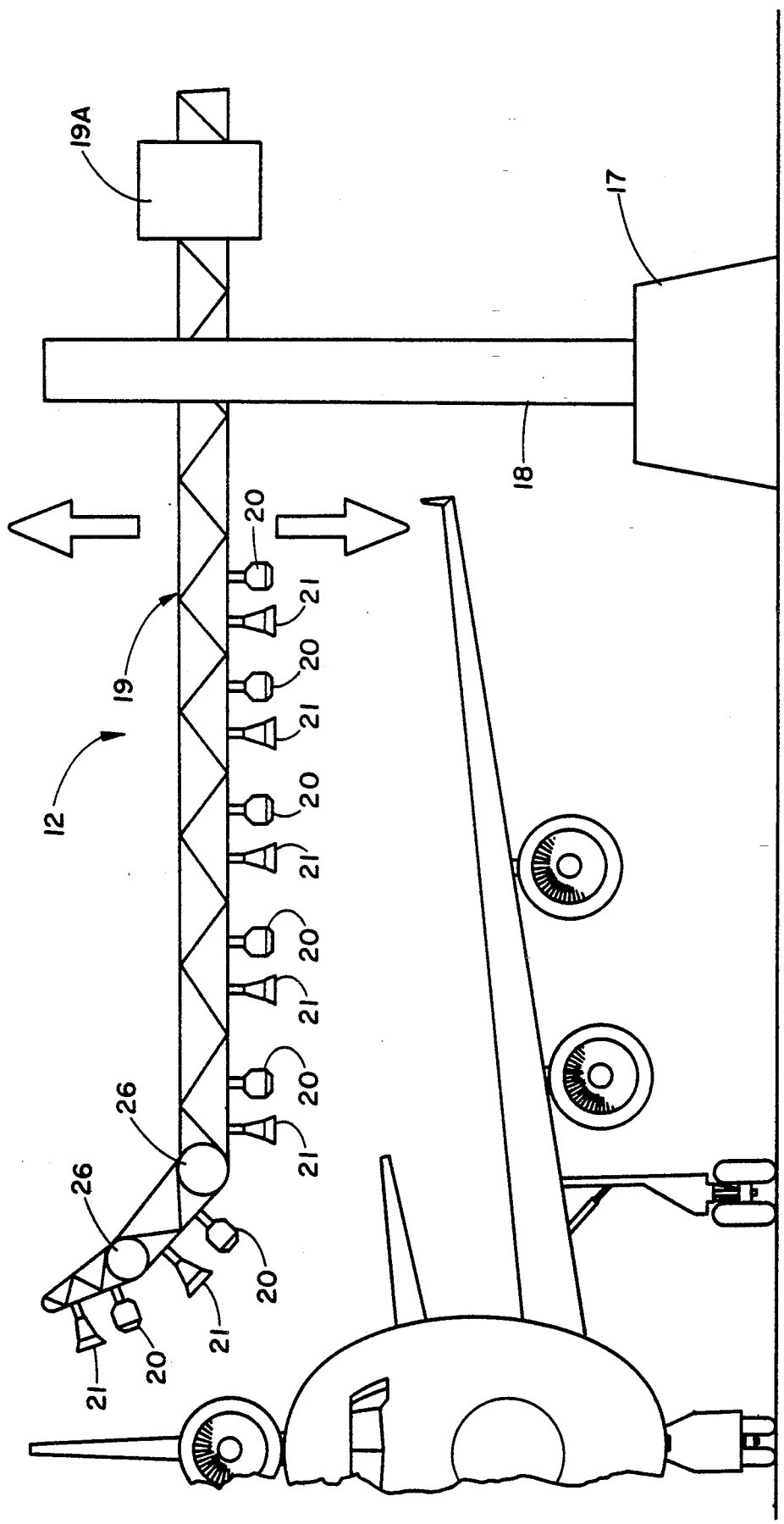
FIG. 2 is a front elevational view of one of the vertically-mounted articulatable booms included in the apparatus of the present invention, showing one of the wings and a part of the fuselage of an aircraft being serviced by the apparatus.
Figure 3:
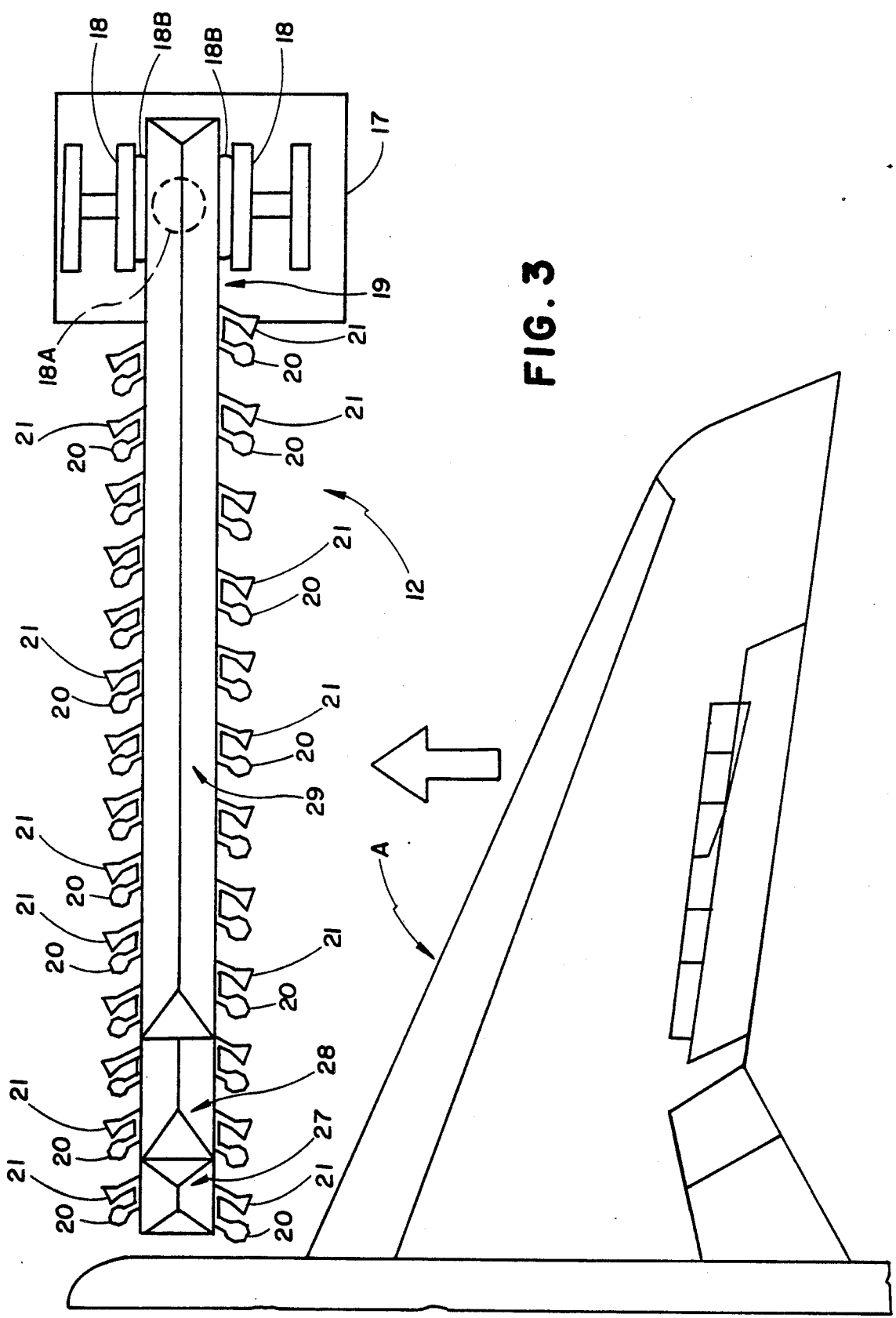
FIG. 3 is a top plan view of one of the articulatable booms, including three respective jointed arms thereof, showing the respective banks of high-pressure and low-pressure nozzles (for de-icing and anti-icing, respectively) and further showing a part of the fuselage and one of the wings of the aircraft passing beneath the articulatable boom.

With reference again to FIG. 1, and with further reference to FIGS. 2 and 3, the upper units 12 include respective articulated booms 19 that are suitably mounted for vertical sliding movement in respective supports 18 mounted on respective bases 17. Each boom 19 is activated vertically by hydraulic cylinders 18A (shown in FIG. 3) to a desired position above the apron 2, thereby accommodating the passage of various aircraft (as shown more clearly in FIG. 2). The raising and lowering of each articulatable boom is accommodated by roller bearings 18B, and each articulatable boom 19 has a counter-balance 19A.

The lower (underwing) units 11 are positioned, preferably, at ground level (in the ground or just above ground level) and substantially below the aircraft and on opposite sides thereof.

If desired, the lower units 11 may be equipped with wheels or other suitable means, so as to make the lower units 11 mobile. Such a feature would permit the lower units 11 to be moved for safe clearance (such as snow removal) during inclement weather conditions. If desired, the entire apparatus may be truck mounted for ease of storage or mobility.

Figure 7:
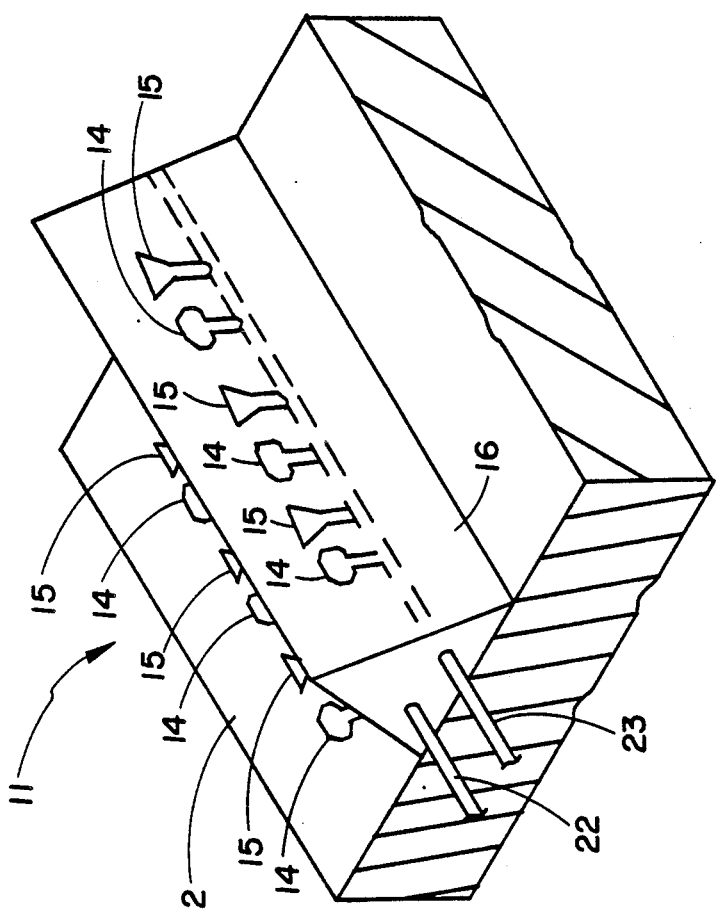
FIGS. 6 and 7 are enlarged view of the respective lower (ground level) units for de-icing and anti-icing the underside surfaces of the aircraft wing.
Figure 6:
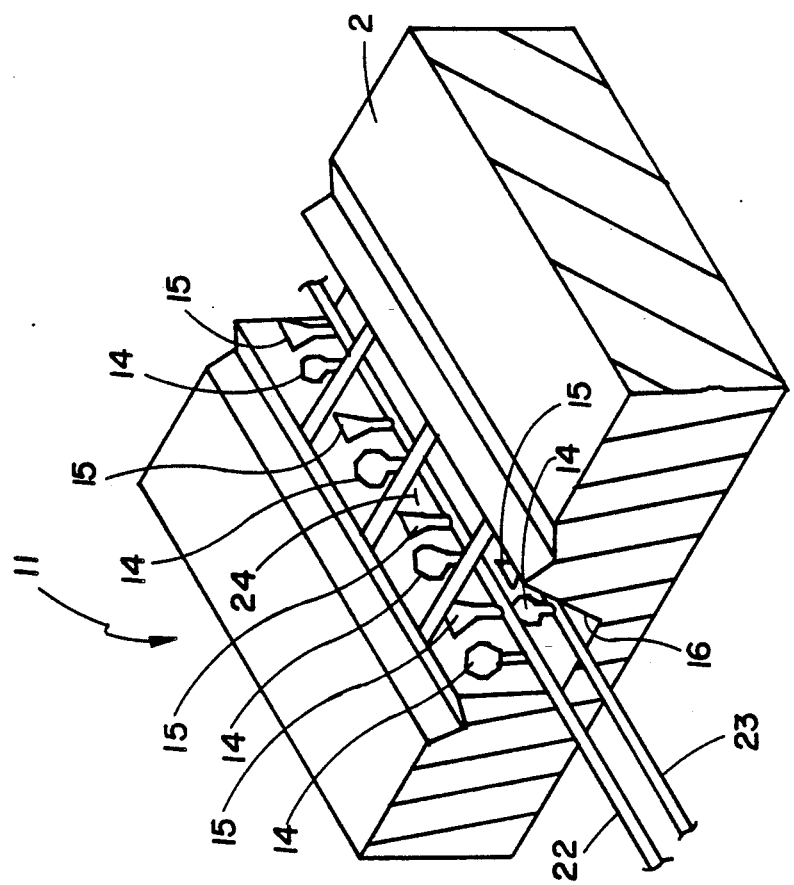

With reference to FIGS. 6 and 7, each lower unit 11 has a respective first group of lower (preferably high-pressure) nozzles 14 disposed thereon. Nozzles 14 provide for the dispensing of pressurized de-icing (and, if desired, cleaning) fluid mixtures onto the underside of the aircraft. In this respect, the first group of lower nozzles 14 are oriented substantially upwardly, so as to dispense the de-icing fluid pressurized mixtures onto the underside of the body and wing of the aircraft.

While each lower unit 11 is intended for de-icing, nevertheless, if desired, each lower unit 11 may be further provided with a respective second group of lower (preferably low-pressure) nozzles 15 disposed thereon. Nozzles 15 provide for the dispensing of pressurized anti-icing (and, if desired, rinsing) fluid mixtures onto the body of the underside of the aircraft. In this respect, the second group of lower nozzles 15 are also oriented substantially upwardly, so as to dispense the fluid pressure mixtures and/or air onto the underside of the body and wing of the aircraft.

Any suitable means (such as bolting, welding, etc.) may be employed to secure the nozzles 14 and 15 to the frame 16 of each lower unit 11. If desired, the nozzles 14 and/or 15 may be removably secured to the frame 16 of the lower unit, thereby facilitating quick maintenance and repair. Also, if desired, the nozzles 14 and/or 15 may be pivotally joined to the frame 16 of the lower unit 11, so that the orientation (or angle) at which they operate can be easily adjusted.

Each of the articulated booms 19, which are disposed on either side of the aircraft being serviced by the apparatus 10, is provided with a respective first bank of upper nozzles 20. These nozzles 20 are directed downwardly towards the aircraft and are preferably of the high-pressure type. Nozzles 20 provide for the dispensing of pressurized de-icing fluids (and/or pressurized cleaning fluids, if desired) onto the top surfaces of the wings and fuselage of the aircraft.

Each articulated boom 19 is further provided with a respective second bank of upper (preferably low pressure) nozzles 21 for downwardly dispensing pressurized fluid mixtures for anti-icing (and/or rinsing, if desired) onto the top surfaces of the wings and fuselage of the aircraft.

Any suitable means (such as bolting, welding, etc.) may be employed to secure the nozzles 20 and 21 to the articulated booms 19 of the upper unit 12. If desired, the nozzles 20 and 21 may be removably secured to the booms 19 of the upper unit, thereby facilitating quick maintenance and repair. Also, if desired, the nozzles 20 and/or 21 may be pivotally joined to the booms 19 of the upper unit 12, so that the orientation (angle) at which they operate can be easily adjusted.

The high-pressure (de-icing) nozzles 20 on the forward portion of each boom 19 are directed downwardly and forwardly of the boom 19 (in the direction towards the approaching aircraft A) while the low-pressure (anti-icing) nozzles 21 on the rearward portion of each boom are directed downwardly and rearwardly of the boom 19 (in a direction away from the approaching aircraft A). Moreover, the angular adjustability of the high-pressure nozzles 14 and 20 and the low-pressure nozzles 15 and 21 (in the lower units 11 and upper units 12, respectively) enhances the impingement characteristics of the de-icing and anti-icing (and/or cleaning and rinsing) pressurized fluid mixtures. This feature contributes to the coverage, economy, and maximum efficiency of the apparatus 10 of the present invention.

With reference again to FIGS. 2 and 3, each articulated boom 19 comprises three arms 27, 28 and 29, respectively. In FIG. 3, arm 27 is labeled "ARM I"; arm 28 is labeled "ARM II"; and arm 29 is labeled "ARM III". Arm 27 is pivotably connected to arm 28, and arm 28 is pivotably connected to arm 29, so that the boom 19 is articulatable to accommodate various aircraft designs and configurations.

The high-pressure nozzles 20 and the low-pressure nozzles 21 (at least on the innermost arm 29) are connected in respective nozzle groups of predetermined lengths. In the preferred embodiment of FIG. 3, the innermost arm 29 ("ARM 111") has nine such groups of nozzles 20 and 21, respectively, although it will be appreciated that any number of nozzle groups may be employed consonant with the teachings of the present invention.

These nozzle groups are actuated in sequence so as to accommodate the wingspan and other configurations of the various aircraft to be de-iced and anti-iced (and/or cleaned and rinsed) using the apparatus 10 of the present invention. This feature of the present invention is illustrated in FIG. 10B, wherein "O" denotes that a particular nozzle group is "ON", and wherein "X" denotes that a particular nozzle group is "OFF". In FIG. 10B, there is only one nozzle group in arm 27 ("ARM I"), one nozzle group in arm 28 ("ARM II"), and nine nozzle groups in arm 29 ("ARM III"), the latter nine nozzle groups being denoted as "NG1"-"NG9", respectively, in FIG. 10B. However, it will be appreciated that any number of nozzle groups on each of the arms 27-29 (and, indeed, any number of pivotably-connected arms 27-29) may be employed on each articulatable boom 19 consonant with the teachings of the present invention. In this manner, only the nozzles of those nozzle groups that are necessary (for proper coverage of the aircraft being serviced) will be operational during each cycle, thereby conserving valuable fluids (specifically glycols) for maximum efficiency and economy of operations.

With reference again to FIGS. 3, 6 and 7, a first portion of the first group of upper and lower high-pressure nozzles 14 and 20, respectively, and a first portion of the second bank of upper and lower low-pressure nozzles 15 and 21, respectively, are in addition to being oriented substantially downwardly and upwardly, respectively, are also oriented substantially forwardly in a first direction. Similarly, a second portion of the first bank of upper and lower high-pressure nozzles 14 and 20, respectively, and a second portion of the second bank of upper and lower low-pressure nozzles 15 and 21, respectively, are in addition to being oriented either substantially downwardly and/or upwardly, respectively, also oriented substantially rearwardly in a second direction. In this manner, the first forward portion of the nozzles 14 and 20, respectively, de-ice (and/or clean) the aircraft; and the second rearward portion of the nozzles 15 and 21, respectively, anti-ice (and/or rinse) the aircraft as the aircraft passes through the apparatus 10. Such an arrangement greatly reduces servicing time and eliminates the need for the aircraft to pass through the apparatus in two different times (or "passes").

Thus, the forward edge or portion of each articulatable boom 19 has both high-pressure nozzles and low-pressure nozzles, and the rearward edge or portion of each articulatable boom 19 also has both high-pressure nozzles and low-pressure nozzles, the nozzles being arranged in nozzle groups (as noted) and being interspersed therebetween. A similar arrangement is provided for the ground-based lower units 11.

Accordingly, the apparatus 10 of the present invention is bi-directional; that is, the aircraft may pass through the apparatus from either direction, thereby providing increased flexibility in the servicing of aircraft, especially under adverse weather conditions. In this manner, the aircraft can be towed or otherwise moved through the apparatus 10 in either, respectively, a first direction or a second opposite direction. Such a feature ensures the efficient use of all the fluid mixtures and equipment being utilized, depending upon the prevailing wind direction and speed. In this regard, it is preferable that the wind be blowing towards the aircraft as the aircraft moves through the apparatus 10.

The nozzles employed herein are either high pressure (i.e., 40 to 500 psi), or low shear, low pressure nozzles that are well known to those skilled in the art. Examples of such high pressure nozzles are the "WASHJET" (type OMEC) or "VEEJET" type HU or U nozzles manufactured by the Spraying Systems Co. Examples of such low pressure nozzles are the "FLOODJET" (type QTK) nozzles manufactured by the Spraying Systems Co.

Figure 5:
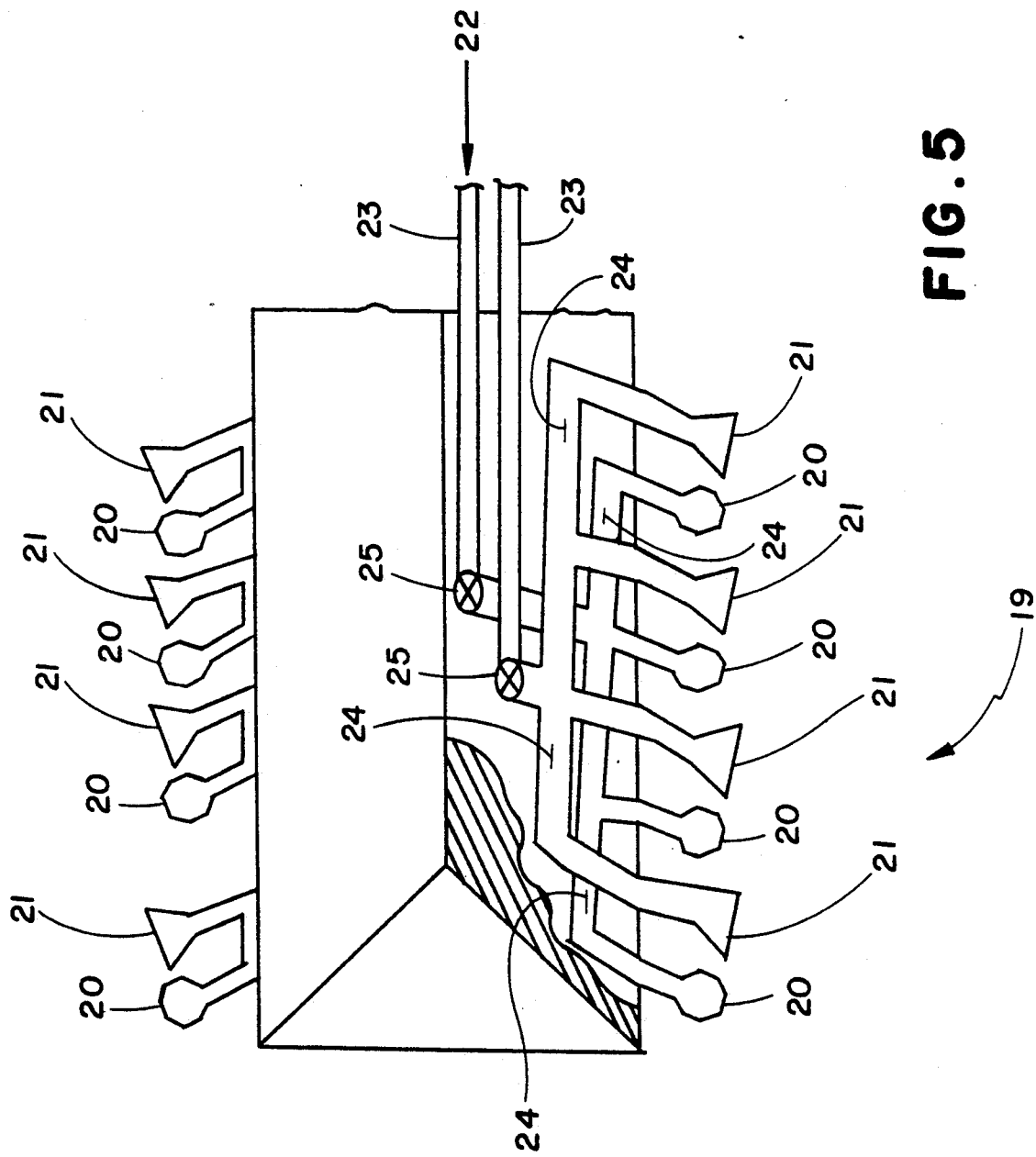
FIG. 5 is an enlarged portion of one of the arms of an articulatable boom (with certain parts broken away and sectioned) to show the orientation and respective manifolds of the first and second groups of high and low-pressure nozzles, respectively, on the articulatable boom and on both sides thereof to provide the desired bi-directional feature of the apparatus.

With reference again to FIGS. 5-7, a plurality of conduits 22 extend between the respective sources of glycol, water and heated air and the respective first and second banks of the upper and lower nozzles 14, 15 and 20, 21, respectively. These conduits 22 provide for (and define a means for) fluid (both liquid and/or gaseous) communication between the sources and the respective nozzles 14, 15 and 20, 21, respectively. Each conduit 22 includes a respective manifold 23 that extends from a respective source. This manifold 23 then branches into respective feed channels 24 that extend from the manifold 23 to the nozzles 14, 15 and 20, 21, respectively. The flow through the conduits 22 is controlled by respective valves 25 that are positioned in the junctions of the manifolds 23 and the feed channels 24 and which may be selectively opened and closed for controlling the flow of the respective pressurized fluid mixtures. While the configuration of the conduits 22, manifolds 23 and feed channels 24 shown herein is preferred, equivalent arrangements may be employed (if desired).

Preferably, all nozzle and piping connections or couplings are of the "quick connect" type (that are well known in industry) for ease of servicing and/or replacement. Also, appropriate filters (not shown) are used in the respective conduits 22.

Respective means are provided for pumping the pressurized fluid mixtures, respectively, from the respective sources thereof through the conduits 22 to the respective nozzles 14, 15 and 20, 21, respectively, for de-icing and anti-icing (and/or cleaning and rinsing) the aircraft. Preferably, this means includes both high pressure pumps and low pressure pumps, respectively. The high pressure pumps provide high-pressure de-icing (and/or cleaning) fluids to the respective first group of upper and lower nozzles 14 and 20, respectively. The low pressure pumps provide low-pressure anti-icing fluids/air to the respective second group of upper and lower nozzles 15 and 21, respectively.

Examples of such pumps (for the high pressure de-icing (and/or cleaning) operations) are the high-pressure centrifugal type pumps commonly utilized in the chemical industry with stationary and/or truck mounted booms with multiple-section articulating arms. Examples of such pumps (for the low-pressure anti-icing and/or rinsing operations) are the low-shear diaphragm pumps No. 66201-244C produced by the ARO Corp., of Bryan, Oh. Preferably, the various pumps (and other equipment) are housed in the enclosure 13; and the various pumps and valves, being conventional, have been shown only schematically in the drawings (see FIG. 9) for ease of illustration.

Figure 8:
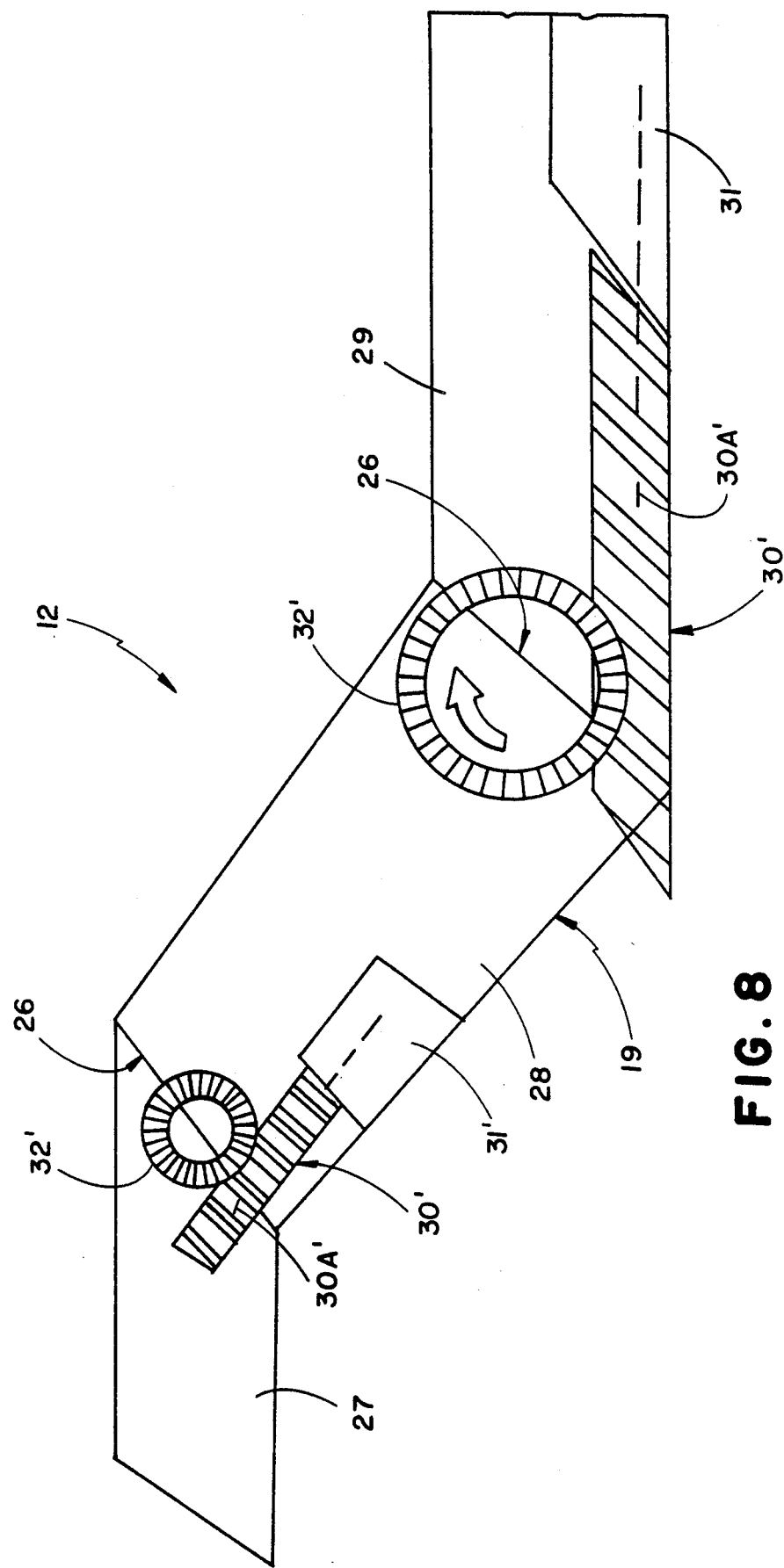
FIG. 8 is an enlarged top plan view of a portion of the articulatable boom, showing the respective linear actuator mechanisms (and the respective gearing actuated thereby) to articulate the respective sections or arms of the boom, thereby selectively adjusting the boom so as to conform to the particular size and shape of the aircraft being de-iced and anti-iced (and/or cleaned and rinsed) thereby.

With reference to FIGS. 2 and 8, the articulatable booms 19 of the respective upper units 12 include at least one (and preferably two) pivot joints 26. These pivot joints define the first, second and third arms 27, 28 and 29, respectively, on the booms 19. In this manner, at least a portion (one or more of the arms 27-29) of the booms 19 may be pivotally movable upwardly and downwardly relative to the respective joints 26. This permits the adjustment of the direction in which the nozzles 20 and 21 carried thereon dispense the respective pressurized fluid mixtures therefrom, in accordance with the varying shapes and heights of the body and wings of the aircraft. Thus, the articulated booms 19 adjust not only in height, but also in angular orientation to accommodate the various configurations of commercial, private and/or military aircraft (i.e., narrow/wide-body, "T" tail, etc.).

Preferably, the pivotal adjustment of the respective arms 27-29 on each articulatable boom 19 is achieved by respective linear actuators and associated gearing. Specifically, arm 29 has a linear actuator 30 including a worm gear 30A rotatably driven by a hydraulic or electric motor 31. Worm gear 30A rotatably pivots a gear 32 carried by arm 28, thereby pivoting arm 28 with respect to arm 29. Arm 28, in turn, has a linear actuator 30' including a worm gear 30A' rotatably driven by a hydraulic or electric motor 31'. Worm gear 30A' rotatably pivots a gear 32' carried by arm 27, thereby pivoting arm 27 with respect to arm 28. While the configuration of the linear actuators described herein is preferred, it is to be understood that any other suitable means for pivotable movement of the respective arms 27-29 in each articulatable boom 19 may be utilized to achieve the same result consonant with the teachings of the present invention. With this in mind, however, the linear actuators 32 may comprise (for example) the SRT type 0.200 RH, 1.000 RH and/or 1.875 RH available from Thomson Saginaw Co. of Saginaw, Mich. These linear actuators will achieve a safe clearance with respect to the aircraft control and lift surfaces (ranging between 5 to 20 feet or 1.5 to 6.1 meters).

An automatic and/or manual control system is provided to engage the proper nozzles bank (or groups of nozzles) and height adjustment sequences (similar to, but not limited to) that specified in the control matrix tables of FIG. 10B.

Figure 4A:
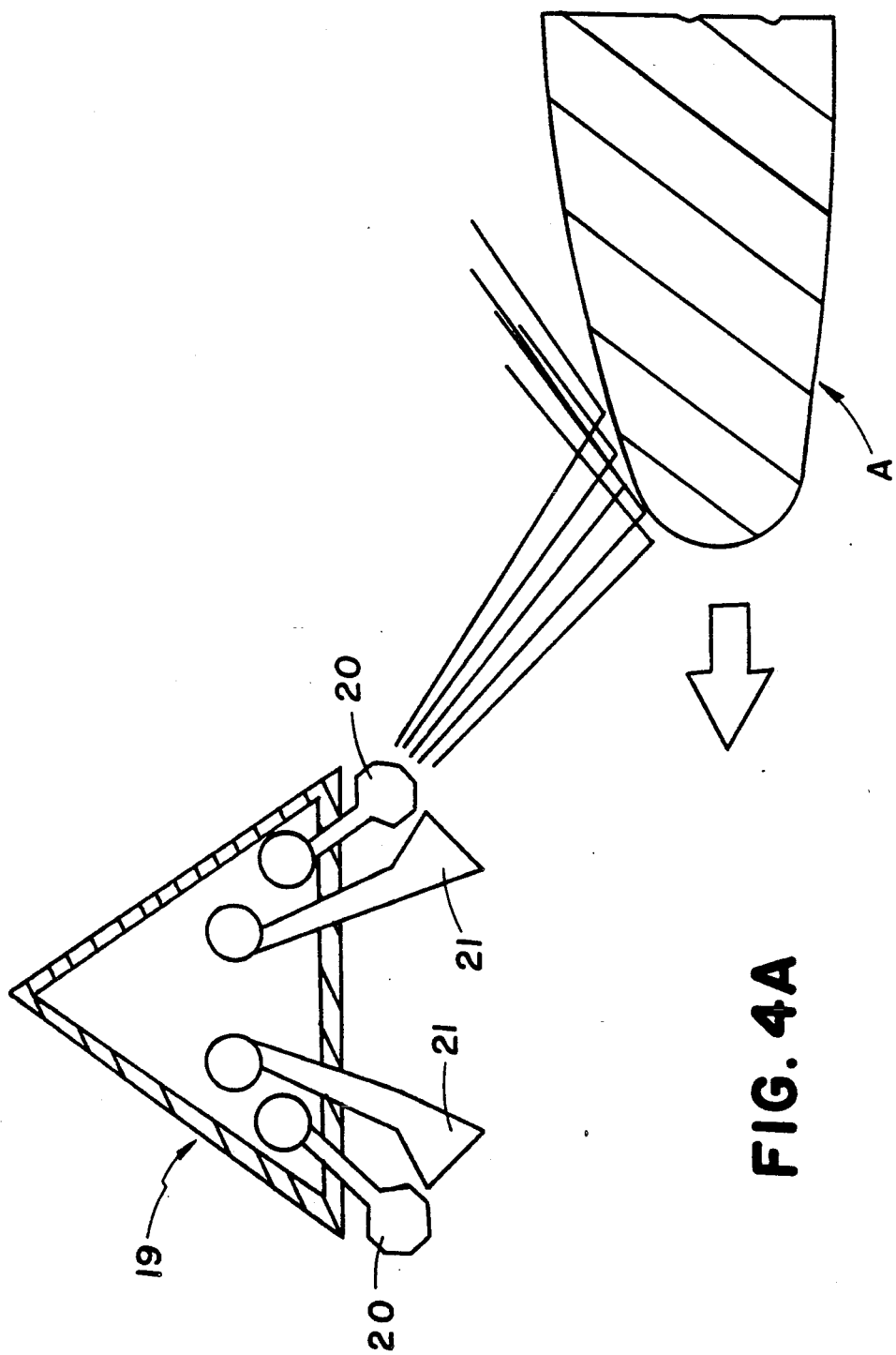
FIG. 4A is an end view of one of the articulatable booms, showing a cross-section of the wing approaching the boom, and further showing the first high-pressure nozzles on the forward portion of the boom being actuated to spray a de-icing fluid (constituting a first pressurized fluid mixture) on to the wing.
Figure 4B:
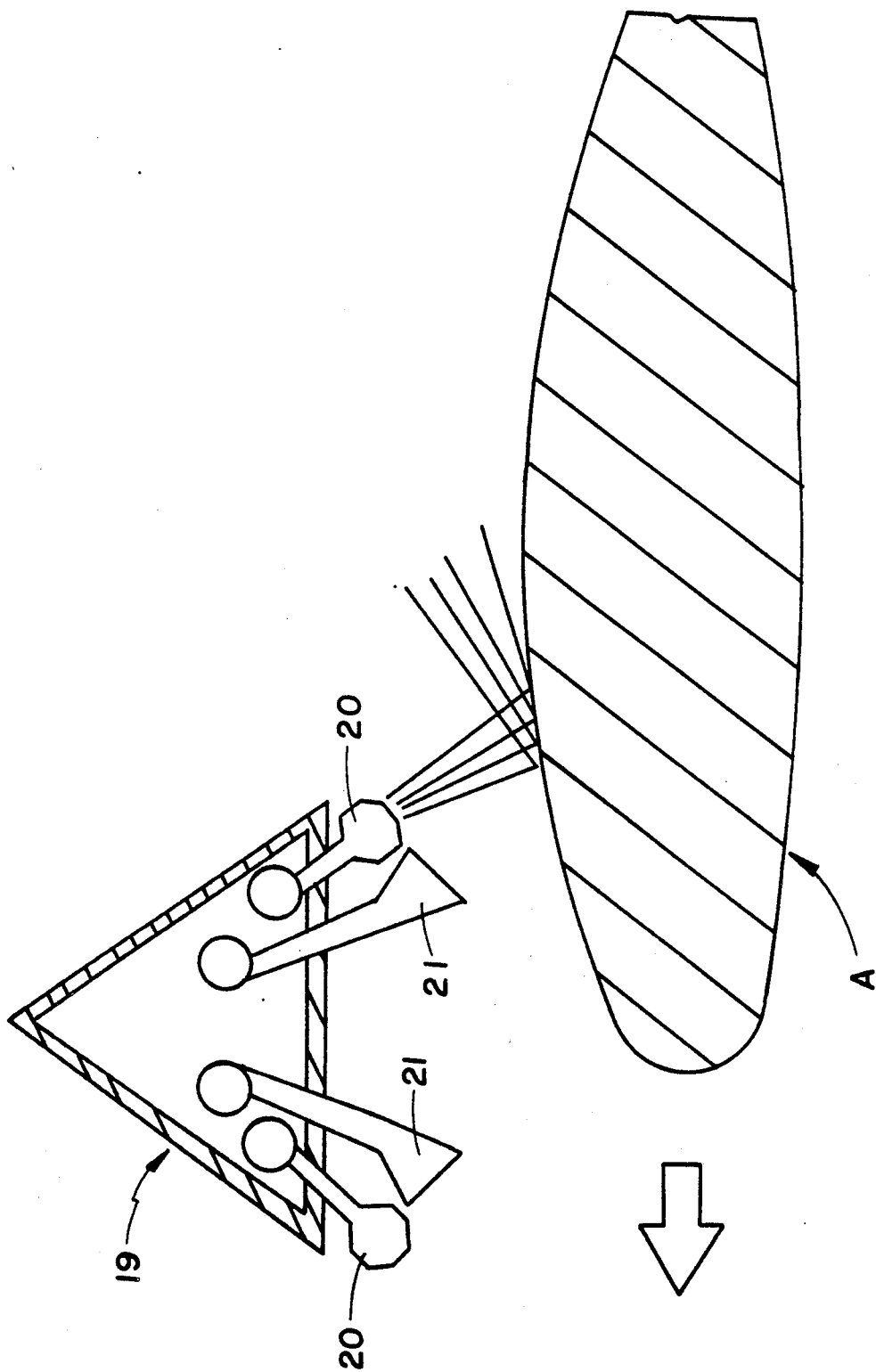
FIG. 4B corresponds substantially that of to FIG. 4A, but shows the wing progressing beneath the boom as the first high-pressure nozzles continue to spray the de-icing fluid on to the wings.
Figure 4C:
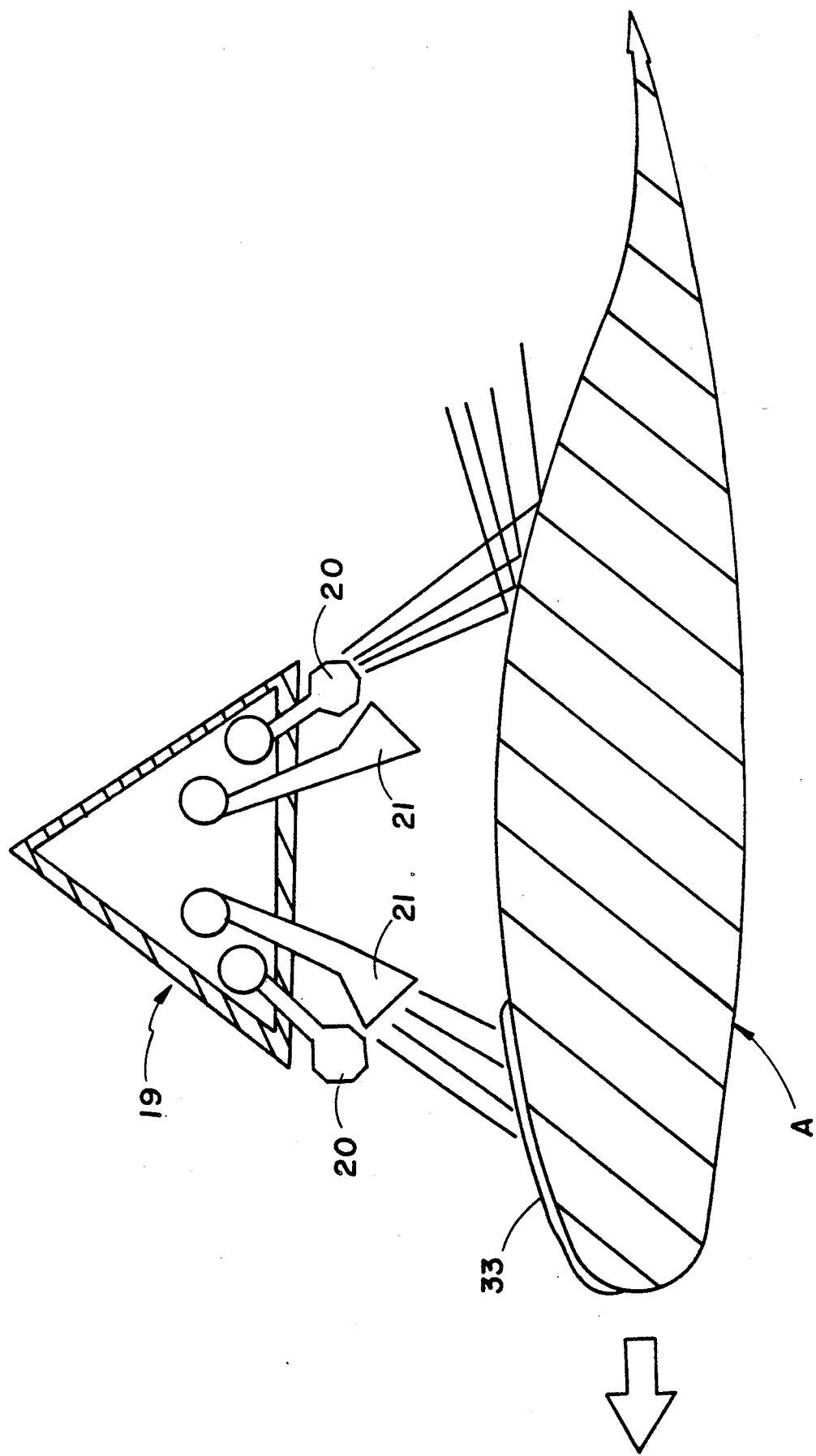
FIG. 4C shows the second low-pressure nozzles on the rearward portions of the boom being actuated to spray an anti-icing fluid (constituting a second pressurized fluid mixture) on to the de-iced portion of the wing, thereby preventing or inhibiting the formation of new ice, snow or sleet on the wing, and further showing the first high-pressure nozzles continuing to spray successive portions of the wing.
Figure 4D:
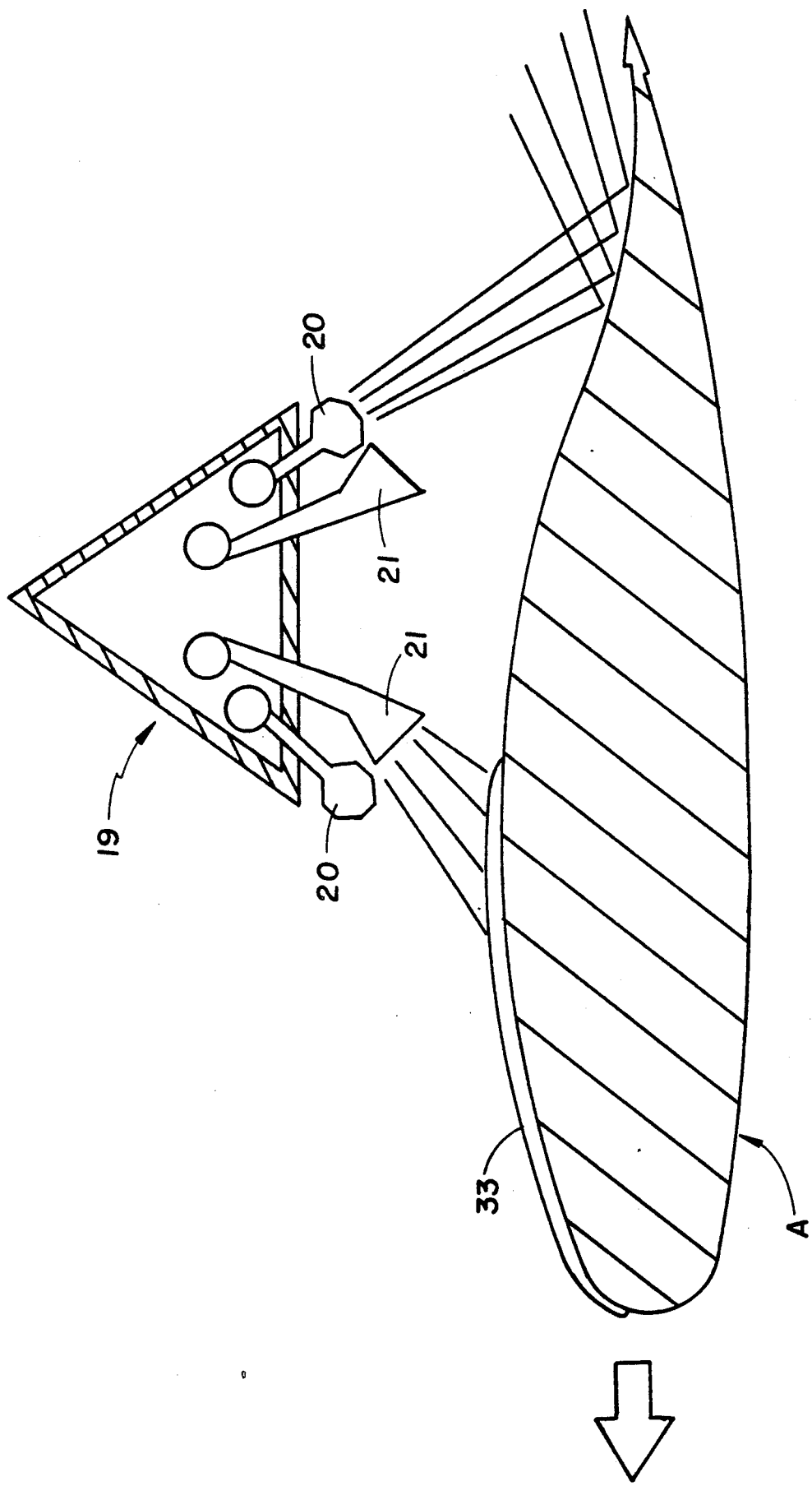
FIG. 4D shows the alternate de-icing and anti-icing of the wing as the wing passes beneath the boom, both nozzles still being actuated.
Figure 4E:
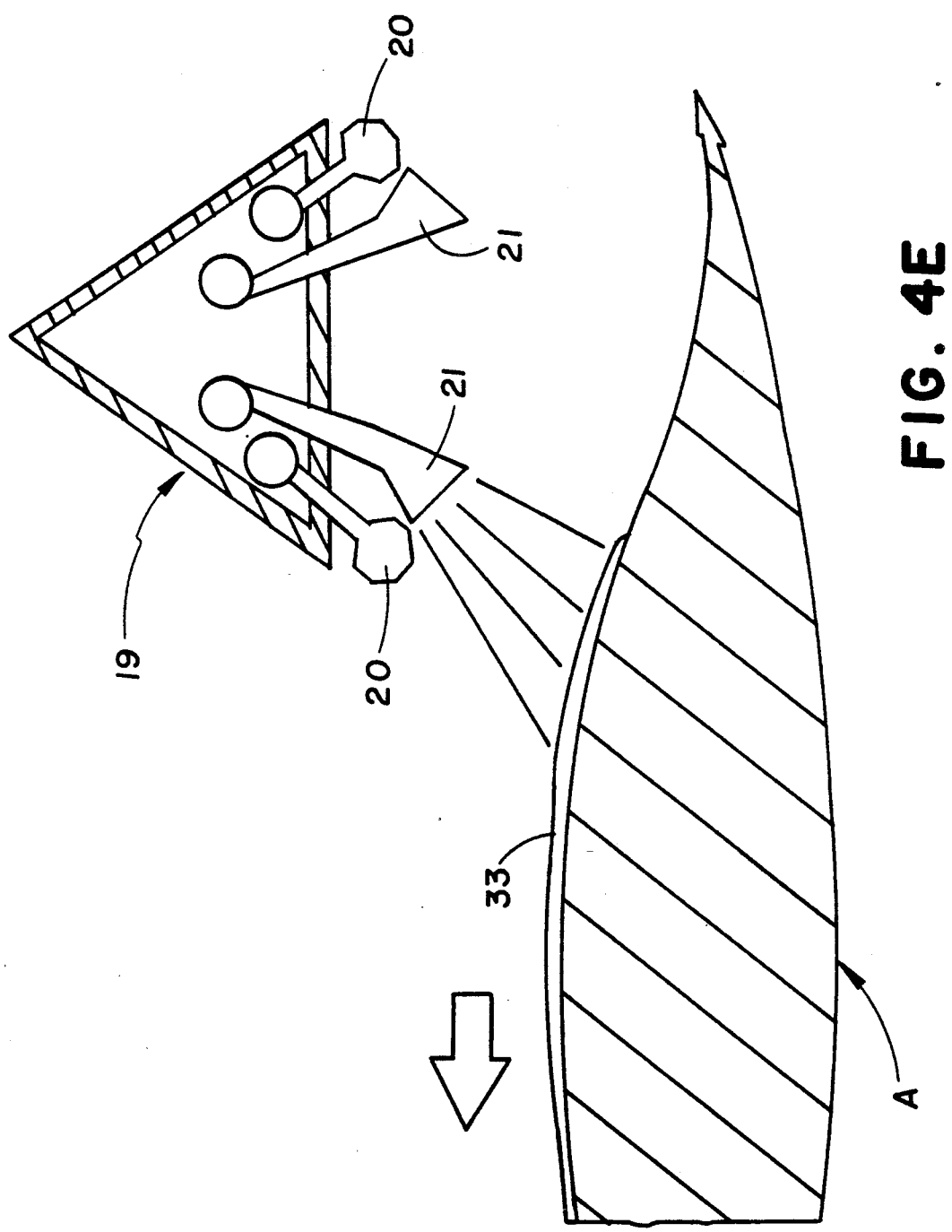
FIG. 4E shows the first high-pressure de-icing nozzles on the forward portion of the boom being de-actuated, as the second low-pressure nozzles on the rear portion of the boom complete the anti-icing operation, as the wing completes its pass beneath the boom.
Figure 12A:
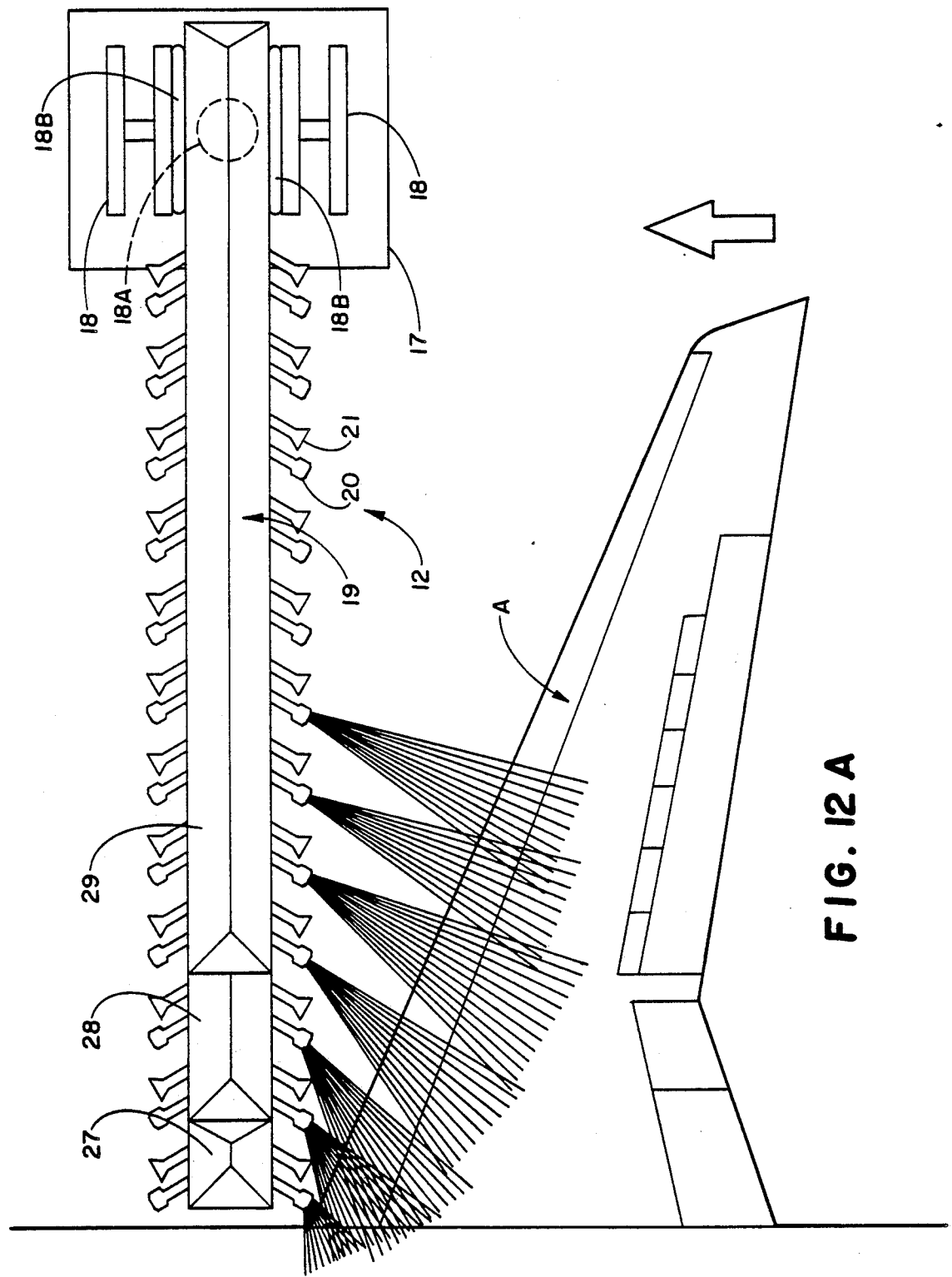
FIG. 12A is a top plan view of the right wing of an aircraft (and part of the fuselage) approaching one of the articulated booms, showing how the high-pressure nozzles in two of the jointed arms (and some of the high-pressure nozzles in the third jointed arm) spray the de-icing pressurized fluid mixture onto the surface of the aircraft wing.
Figure 12B:
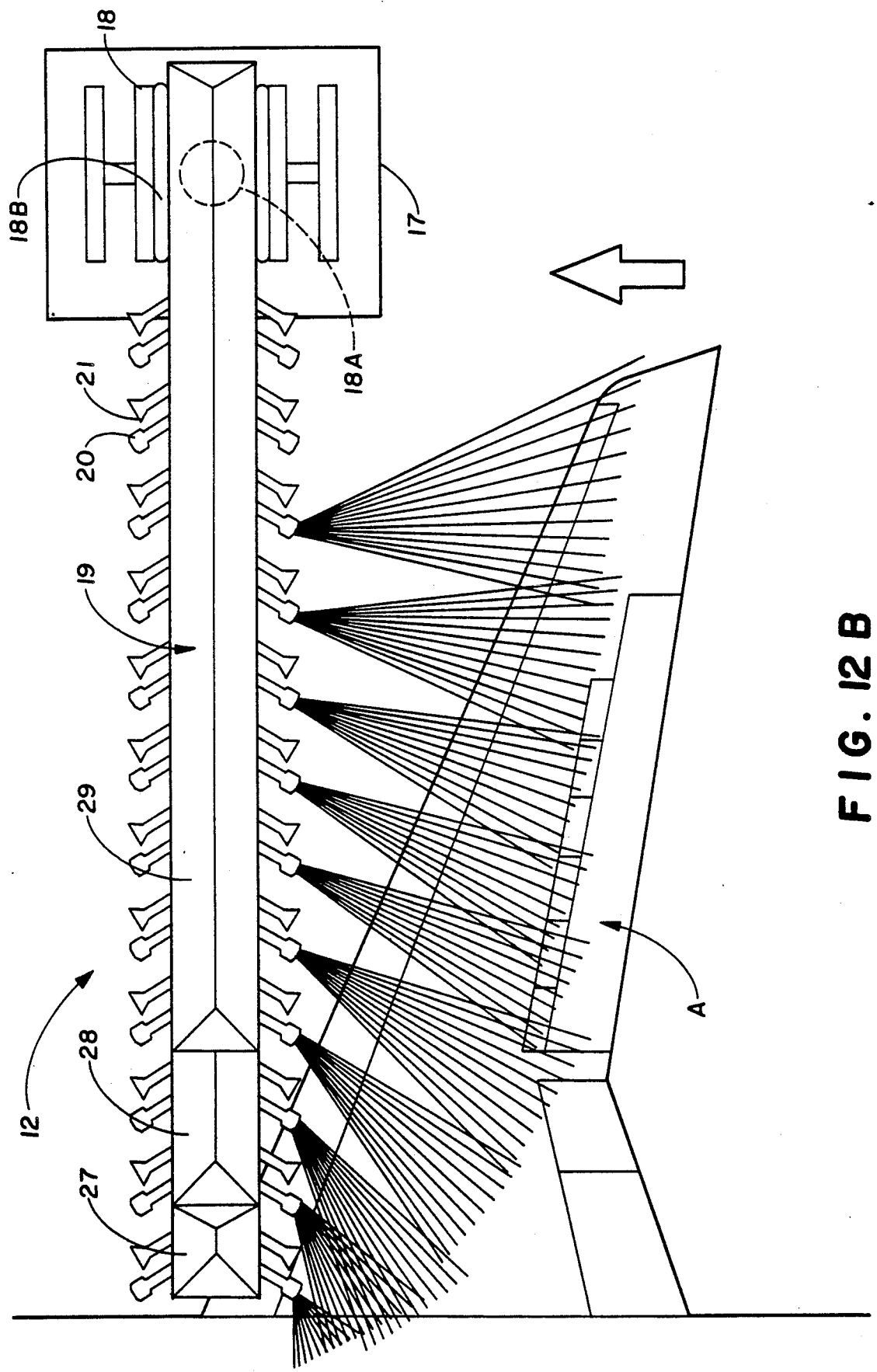
FIG. 12B is a further top plan view, corresponding substantially to that of FIG. 12A, but showing the additional high-pressure de-icing nozzles being actuated on the third arm of the articulatable boom ("ARM III") as the aircraft is being towed progressively through the apparatus of the present invention.
Figure 13:
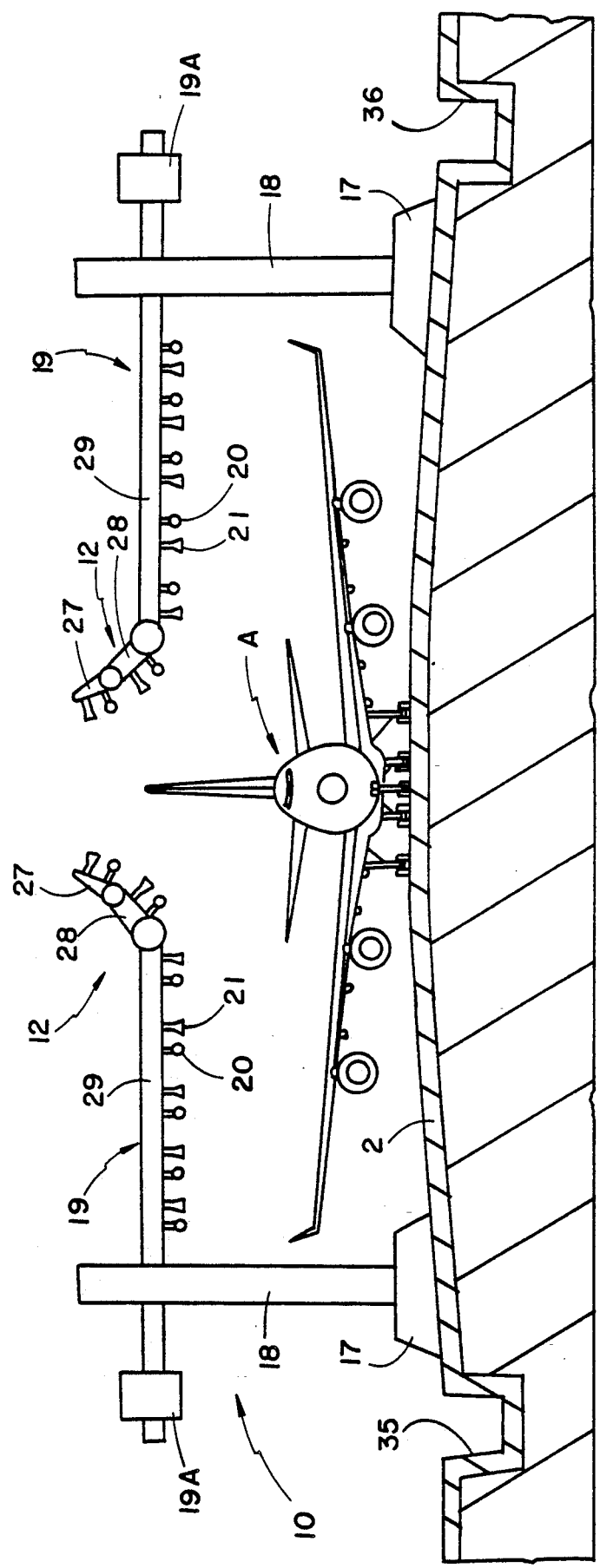
FIG. 13 is a front elevational view of the apparatus of the present invention, showing a typical aircraft being serviced within the apparatus, and further showing how the apron or tarmac is crowned and cooperates with side channels or gutters to collect run-off of the respective pressurized fluid mixtures being sprayed on the aircraft, the degree to which the apron is crowned being exaggerated for purposes of illustration.

With respect to FIGS. 4A-4E and FIGS. 12A-12E, respectively, as the wing of the aircraft A approaches the boom 19, the downwardly and forwardly high-pressure nozzles 20 on the boom 19 spray a de-icing first pressurized fluid mixture on to the wing (shown in cross-section) as shown more clearly in FIG. 4A. As the aircraft A continues beneath the boom 19, as shown in FIG. 4B, more banks or groups of high-pressure nozzles 20 are actuated or made operational to de-ice the forward position of the wing of the aircraft A, as shown more clearly in FIG. 12B. In FIG. 12B, the spray pattern of the high-pressure nozzles partially overlap, thereby providing the desired de-icing effect without wasteful and random spraying of the de-icing fluid. Thereafter, as the aircraft A continues beneath the boom 19 and progressively through the apparatus 10, the downwardly and rearwardly-directed second anti-icing low-pressure nozzles 21 on the rearward edge or portion of the boom 19 become operational (as shown in FIG. 12C) to lay down an anti-icing coating 33 (of glycol, etc.) on to the forward portion of the aircraft wing, as shown more clearly in FIG. 4C. This simultaneous de-icing and anti-icing process used in the single integrated apparatus 10 of the present invention continues, as shown in FIGS. 4D and 12D, respectively. Finally, as shown in FIGS. 4E and 12E, respectively, the de-icing process is completed, and the anti-icing process is continuing towards completion as the aircraft A has substantially passed through the apparatus 10 and beneath the boom 19.

Having thus described the apparatus 10 of the present invention, the preferred method or procedure will now be described; and the features and advantages of the present invention will be more fully appreciated. With reference to FIGS. 10B, 11B, and 12A-12E, a Boeing 757-200 aircraft is utilized to describe the process; this aircraft is a new generation, narrow-body, mid/long range design typifying aircraft of the next decade.

The method of the present invention involves two basic steps: (1) de-icing; and (2) anti-icing (and/or cleaning and rinsing). In the first step, the force of the heated, compressed de-icing fluids performs perhaps 90% of the de-icing action. Moreover, use of this de-icing method preserves engine life, since the fluids being utilized will not corrode engines and, more particularly, the turbines.

A nominal stand-off distance of between two and twenty feet from the aircraft surface will provide adequate safety clearance from the apparatus 10 while allowing the most efficient cleaning process to achieve the greatest margin of flight safety. In addition, sufficient overlap between the adjoining nozzle groups ("NG(s)") provides adequate coverage for all environmental conditions during which the aircraft may reasonably be expected to operate.

The reference times listed begin as the aircraft (in this example, the 757-200) approaches the staging area for the apparatus 10 (which may straddle an existing taxiway/ramp area).

APPROXIMATE TIME (expressed in minutes and seconds)

1:00 The aircraft is stopped and its engines are shut down. The tow bar is connected to the aircraft by the ground crew and cockpit-ground communication is established. This action ensures that the aircraft will travel through the apparatus 10 at a substantially constant, predetermined rate of speed. In addition, the engines receive a minimal ingestion of glycol (it being noted that the ingestion of glycol will reduce engine life).

2:00 The external power cord from the tow tractor is connected to the aircraft allowing the Auxiliary Power Unit ("APU") to be shut down, reducing glycol ingestion to the minimum. While the aircraft is towed to the Initial Position ("IP"), three-way communication is established among the cockpit, ground crew, and the operator of the apparatus (in the tower 1).

3:00 The operator controls the apparatus 10 from the tower 1, initially directing the linear-actuated axis of the pivotable arms 27 and 28 and the linear actuators 30–32 and 30' to 32' to assume the proper configuration of the articulatable booms 19 (in both height and orientation) for the particular aircraft about to be processed. As the aircraft is towed in either a first direction or a second (opposite) direction through the apparatus 10 at a predetermined speed (estimated at 1 mph) the two movable arms 27 and 28 have been prepositioned for the particular configuration and will operate during the entire fuselage transit.

3:45 As the wing root reaches the articulatable boom 19, a first bank of nozzles (nozzle group NG1) is operated to clean and coat the wing from the root/fillet area out to approximately 50 feet from the reference centerline of the aircraft over which the nosewheel is directed.

4:15 The wing is now adjacent to a second bank of nozzles (nozzle group NG2) which is operated to clean and coat the wing surface from approximately 50 feet to 57 feet from the centerline.

4:30 Finally a third bank of nozzles (NG3) operates out to about 65 feet and succeeds in clearing the 124.9 foot wingspan which extends 62 feet from the centerline of the aircraft. The first nozzle group NG1 discontinues operation.

4:45 The second nozzle group NG2 discontinues operation.

5:00 The third nozzle group NG3 discontinues operation. Arms 27 and 28 are repositioned to provide proper coverage (both height and orientation) for the tail/empennage area of the aircraft.

5:30 Arms 27 and 28 discontinue operation since the de-icing (and/or cleaning) cycle is substantially completed. As the aircraft is towed to the engine starting ramp, the APU is restarted which provides electrical and pneumatic power for the engine start process.

6:30 The aircraft is visually inspected by a designated airline representative who provides the operational approval and legal clearance for the aircraft to proceed. The external power cord and towbar are disconnected during the engine start sequence. After the appropriate checklists are accomplished and taxi clearance is obtained, the ground crew will disconnect the headset used for cockpit communications and provide a visual waveoff signal for the aircraft to depart.

8:30 The aircraft now proceeds under normal engine power to the departure runway in use. It will now be available for acceptance into the Air Traffic Control departure traffic pattern.

FIGS. 10A–10E illustrate how the respective nozzle groups on the respective arms 27–29 will be sequenced or cycled, as the aircraft is towed through the apparatus 10 of the present invention; and the desired surfaces of the wings and fuselage of the aircraft are first de-iced (and/or cleaned) and, second, anti-iced (and/or rinsed) progressively as the aircraft makes its single pass relative to the apparatus 10, it being understood that some surfaces of the aircraft will be anti-iced as other surfaces of the aircraft are still being de-iced.

The Type I fluid used in de-icing are the basic antifreeze comprising ethylene glycol. The mixture of the Type I fluid and water will vary from 10% ethylene glycol to 90% water, and vice versa, or even 100% ethylene glycol to water, and vice-versa, depending upon the particular weather conditions and the type of ice being removed from the aircraft. In ordinary cleaning operations, however, the fluid is basically all water.

The Type II fluids used in de-icing and anti-icing are the newer anti-freezes comprising propylene glycol (which has three carbons in its chain, rather than the two carbons for ethylene glycol). Type II fluids have higher viscosity, and a polymer thickening agent is often employed in the Type II fluids. These Type II fluids are designed to break down because of shear forces due to the kinetics of air flow over the aircraft (and, more particularly, the top surface of the wing) as the aircraft proceeds down the runway for take-off. After proper lift and take-off, and under normal flight conditions, it is desirable that the Type II fluids be removed from the aircraft (by the aforesaid shear forces) to reduce unnecessary weight contributing to drag on the aircraft.

The washing cycle is similar to the de-ice/anti-ice process with the following exceptions: (1) the cleaning spray will consist of heated compressed air/water/solvent or any combination thereof; (2) the coating cycle will be a rinsing cycle using water/air (heated and/or compressed)/solvent/any other substance which has been determined to assist the cleaning process; and (3) at the completion of the washing cycle, the aircraft may start its engines and taxi or it may continue to be towed back to its assigned position.

Finally, means is provided for collecting the glycol and water dispensed by the nozzles 14, 15, 20 and 21 and for distilling, separating, filtering and recycling the glycol and water for further use. The components of this system include, but are not limited to, appropriate equipment for the proper drainage, collection, separation (distillation), filtration and reconstitution of the fluids. The schematic of the preferred means can be seen with reference to FIG. 7.

Figure 14:
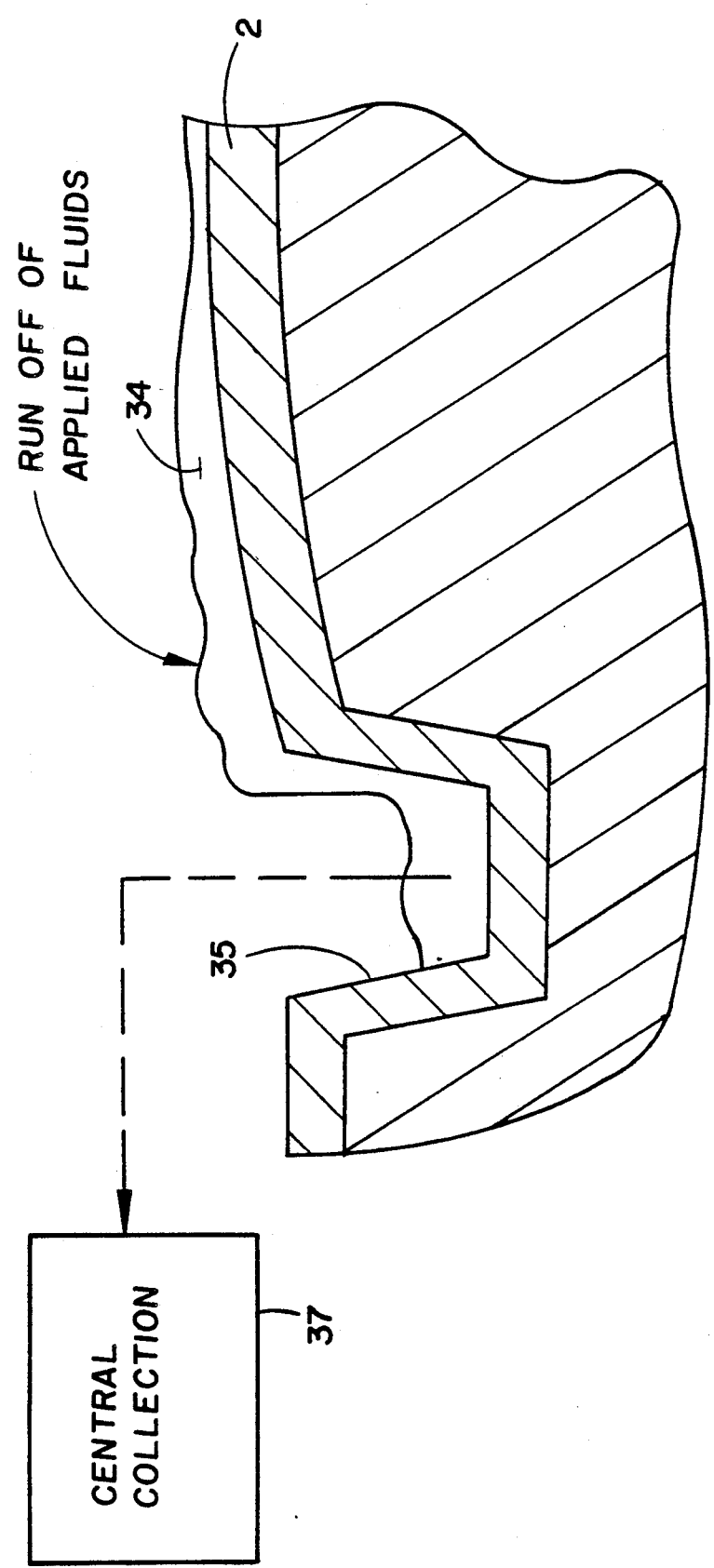
FIG. 14 is an enlarged view of a portion of FIG. 13, showing (schematically) the run-off being collected at a central location for subsequent recycling.

With reference to FIGS. 12 and 14, the tarmac 2 is preferably "crowned" so that the Type I and Type II anti-freeze fluids and/or fluid mixtures (the glycols) will run off the tarmac 2, and the run off 34 will be collected in respective side gutters or channels 35 and 36 for pumping to a central collection 37 for recycling purposes.

Figure 9:
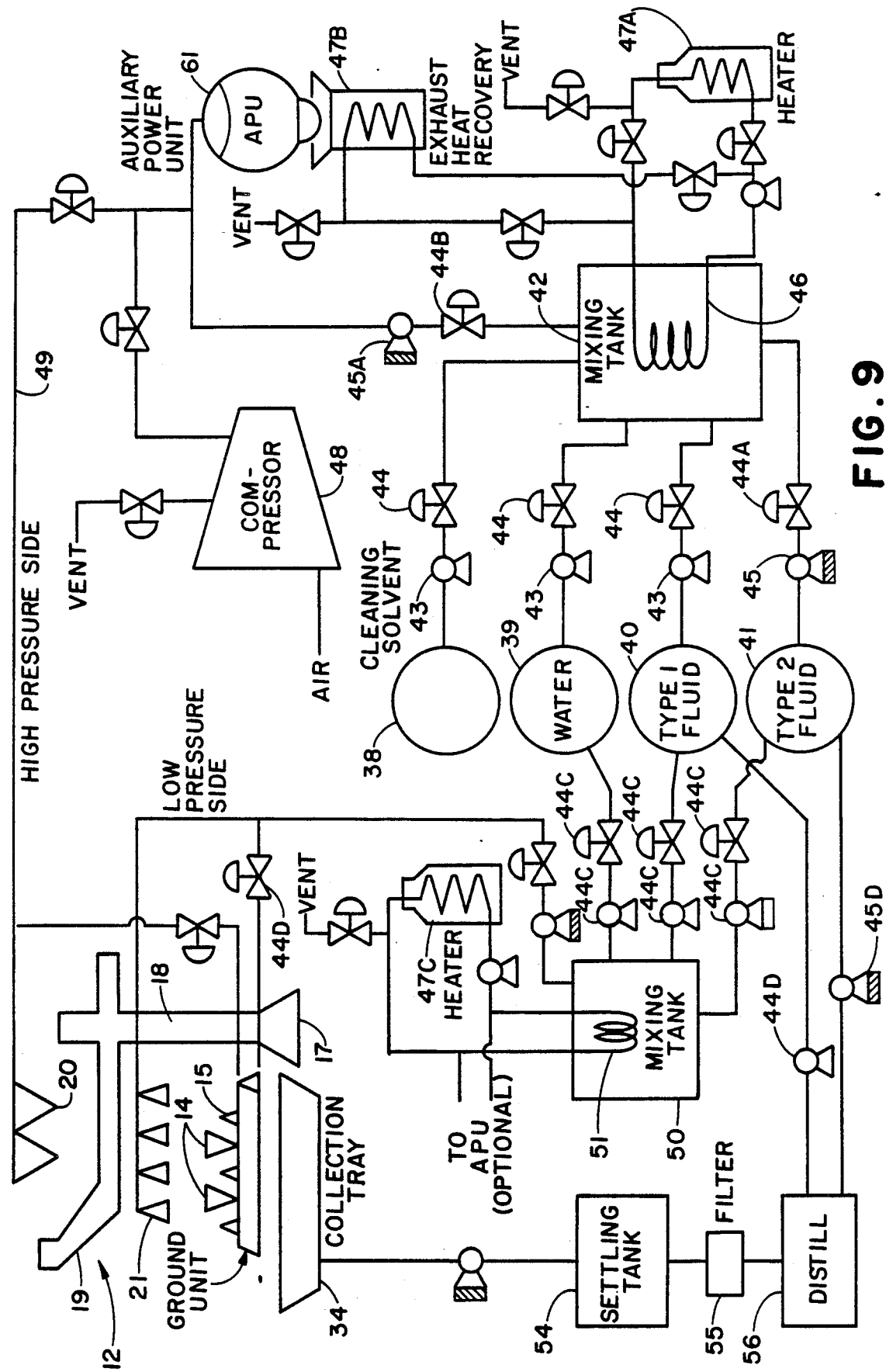
FIG. 9 is a schematic diagram (or flow chart) of the apparatus and method of the present invention, showing the means for supplying and distributing the respective pressurized fluid mixtures to the respective groups of first high-pressure nozzles and second low-pressure nozzles.
Figure 11A:
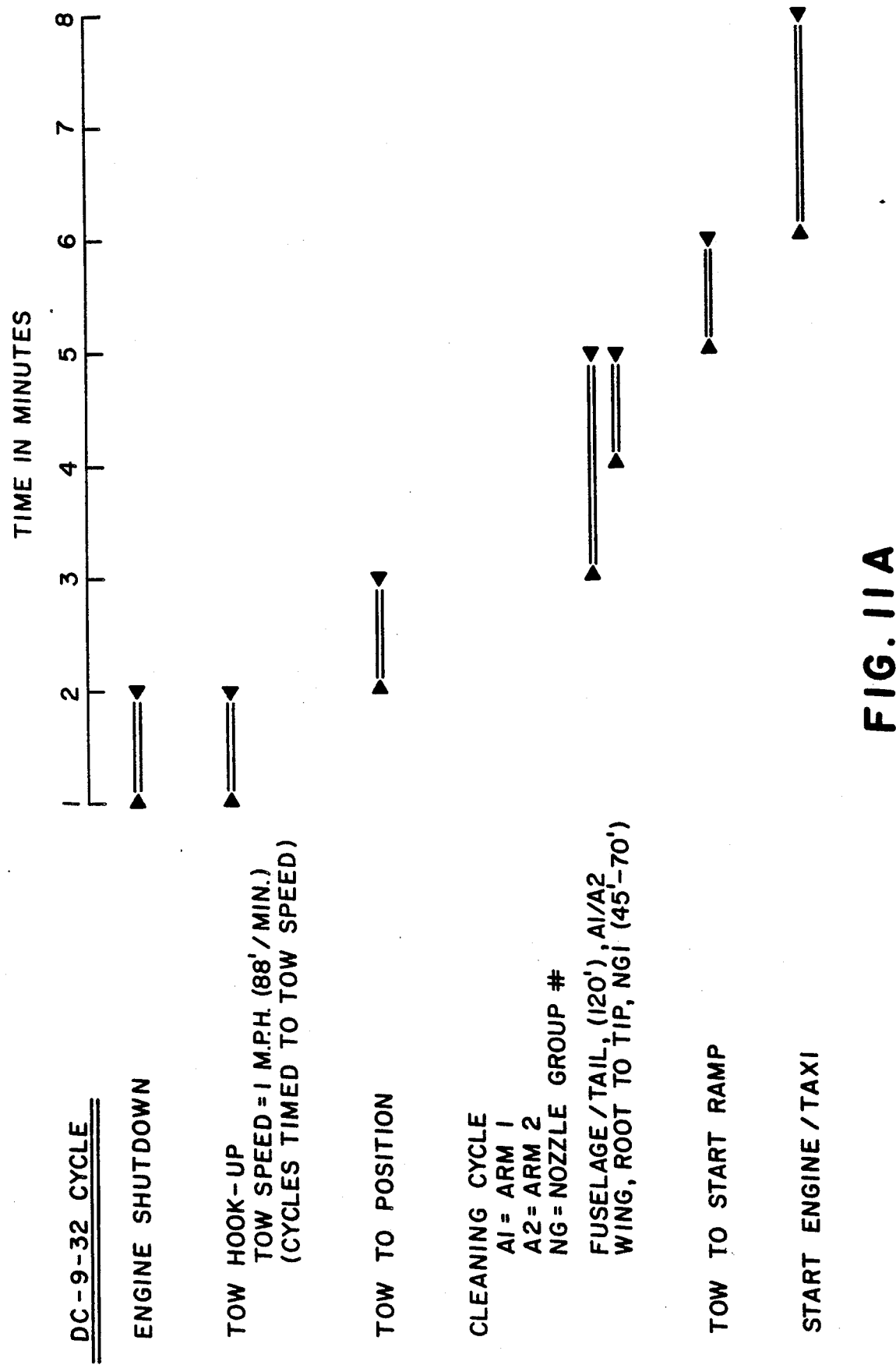
FIG. 11A is a Gantt-type chart illustrating the process or sequencing of the DC-9 aircraft, showing the elapsed time (in minutes) for de-icing and anti-icing (and/or cleaning and rinsing) the DC-9 aircraft through the respective steps in the cycle thereof.
Figure 11B:
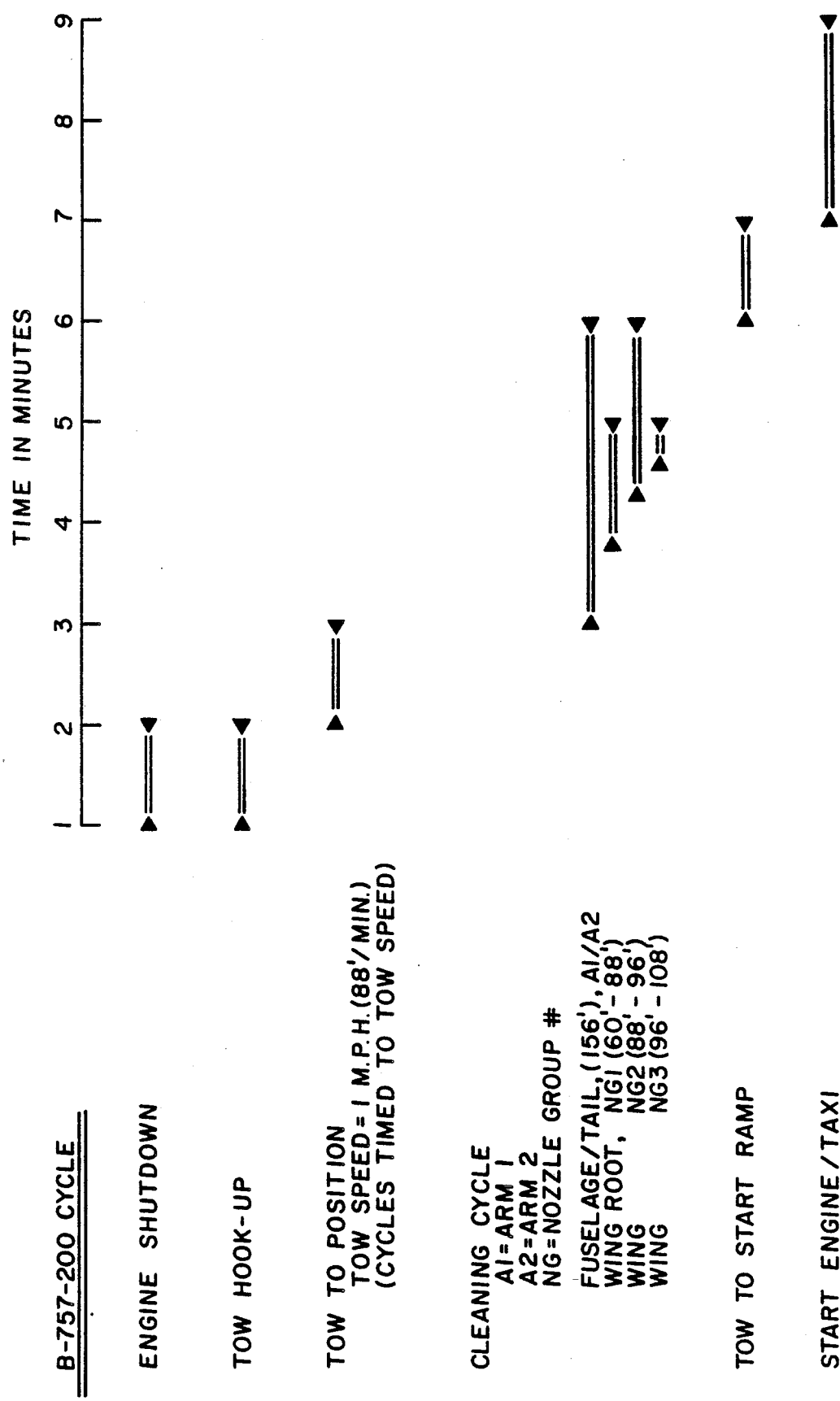
FIG. 11B is a Gantt-type chart, corresponding substantially to that of FIG. 11A, but for the B-757-200 aircraft.
Figure 11C:
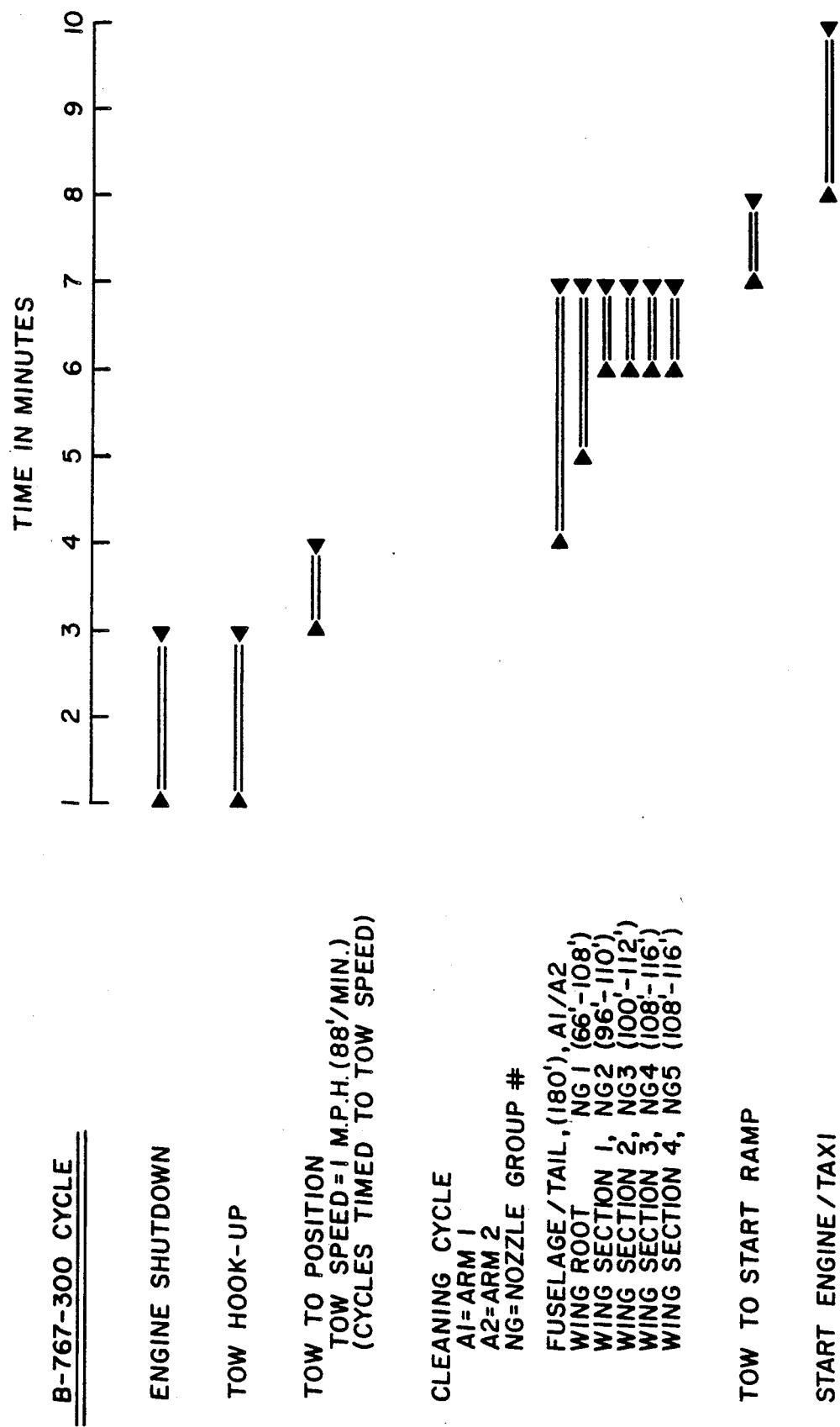
FIG. 11C is a Gantt-type chart for the B-767-300 aircraft.
Figure 11D:
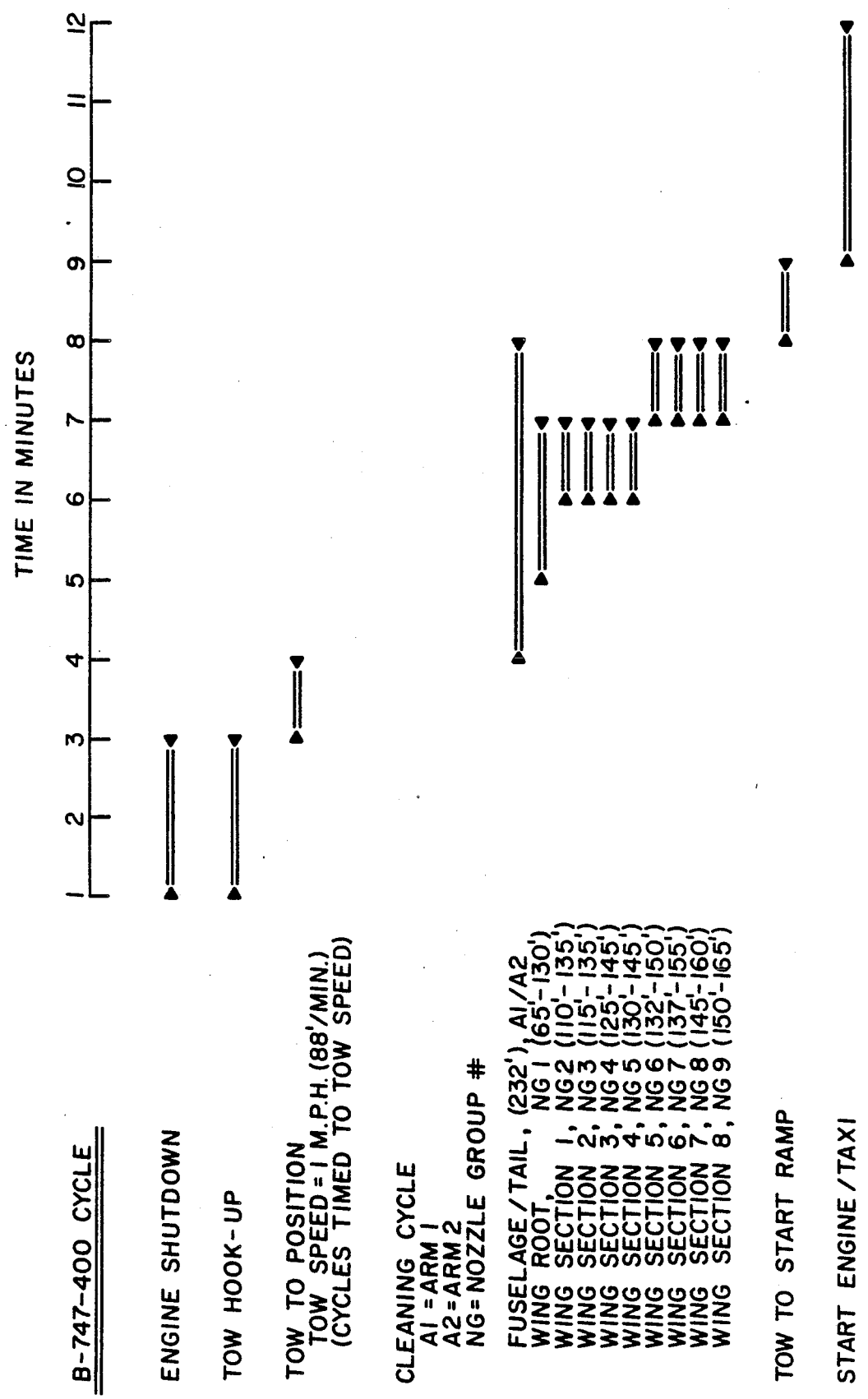
FIG. 11D is a Gantt-type chart for the B-747-400 aircraft.

With reference to FIG. 9, the apparatus 10 of the present invention employs a cleaning solvent (or detergent), water, Type I fluid and Type II fluid in tanks 38, 39, 40 and 41, respectively. The cleaning solvent 38, water 39 and Type I fluid 40 is pumped to a first mixing tank 42 by means of pumps 43, and the flow is controlled by valves 44. The Type II fluid 41 is pumped to the first mixing tank 41 by a diaphragm pump 45 and is controlled by valve 44A. Preferably, the first mixing tank 42 is heated by a coil 46 (or other heating means) connected to a suitable heater 47 (or heat exchanger). The flow from the first mixing tank 42 is controlled by a valve 44B and pumped by a diaphragm pump 45A. An air compressor 48 mixes with the heated fluid from the first mixing tank 42 to provide a first pressurized fluid mixture to the high-pressure side 49 of the apparatus 10 and, more particularly, to the high-pressure nozzles 20.

In this regard, it will be appreciated that the ratios of the constituents in the first pressurized fluid mixture to the high-pressure de-icing nozzles 20 of the high-pressure side 49 (and/or including the degree of heat and compressed air being applied) may be varied easily and conveniently to meet the particular icing conditions encountered in inclement weather.

The water 39, Type I fluid 40 and Type II fluid 41 is pumped by pumps 44C (controlled by valves 44C) to a second mixing tank 50. The mixture in the second mixing tank 50 is heated (if desired) by a heating coil 51 (or its equivalent) supplied by a heater 52 (or other heat exchanger). The mixture from the second mixing tank 50 is pumped via diaphragm pump 45B (controlled by valves 44D) to the low-pressure side 53 to the low-pressure nozzles 21 in the articulated boom 19. It will be appreciated that, in FIG. 9, only the lower units 12 are shown (and not the lower units 11) for ease of illustration.

The run-off 34 is collected by the gutters 35 (or other collection means) and is pumped by a diaphragm pump 45C to the central location 37 (shown in FIG. 14). This central location 37 includes a settling tank 54, filter 55 and distiller 56. The distiller 56 separates out the Type I and Type II fluids. The Type I fluid is pumped by diaphragm pump 45D from the distiller 56 to the storage tank 41, and the Type I fluid is pumped by pump 44D from the distiller 56 to the storage tank 40. Thus, the run-off 34 from both the high-pressure size 49 and the low-pressure side 53 is collected, separated into its Type I and Type II fluid components, and recovered for subsequent recycling. This preserves the environment while effecting economies.

Figure 15:
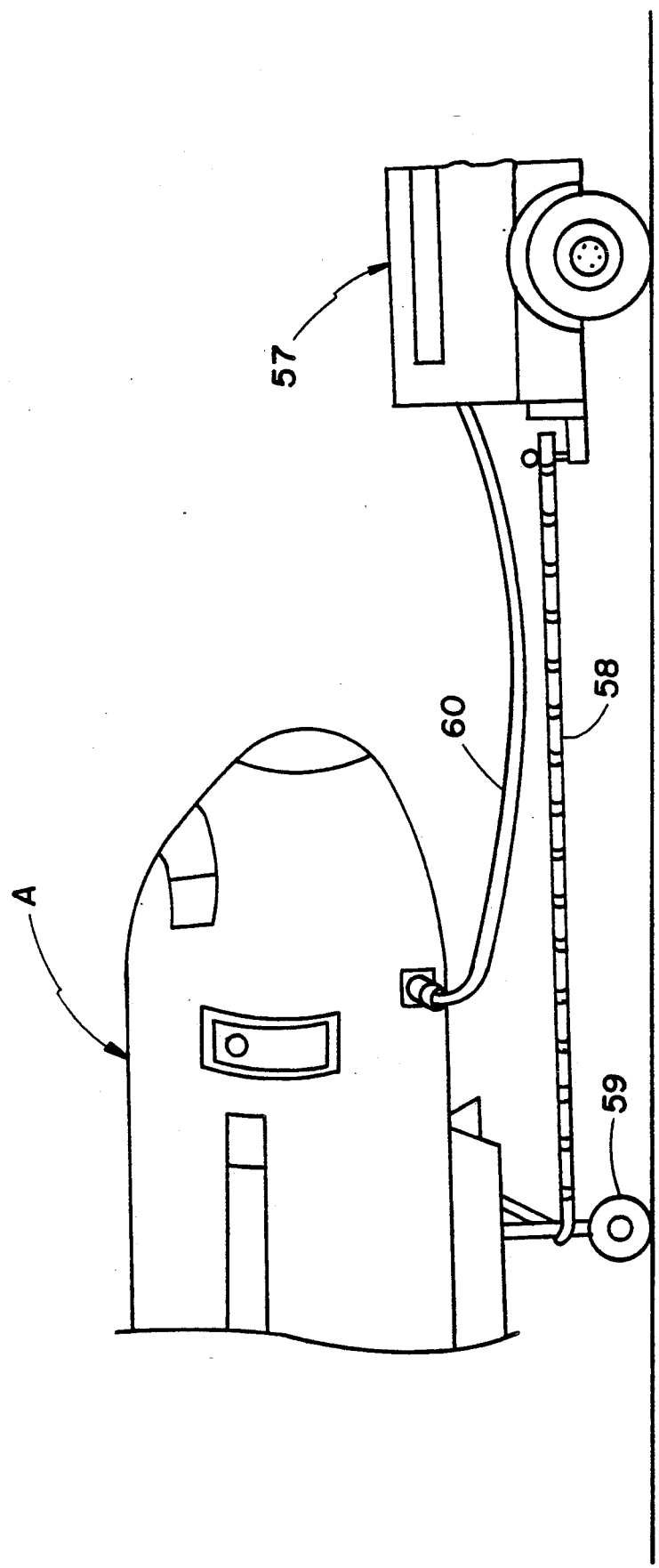
FIG. 15 illustrates how an aircraft being towed through the apparatus of the present invention may be supplied with power directly from the tow truck, so that the auxiliary power unit ("APU") in the aircraft may be shut down, thereby precluding the ingestion of glycols into the APU of the aircraft.

With reference again to FIG. 1, and with further reference to FIG. 15, the aircraft A is preferably towed through the apparatus 10 of the present invention by a tow truck 57 having a tow bar 58 connected to the landing gear 59 of the aircraft A. The aircraft A will be towed through the apparatus 10 at about one (1) mile per hour (88 feet per minute or approximately 1.5 feet per second). Moreover, power may be supplied from the tow truck 57 to the aircraft A by means of a power cable 60. As a result, the auxiliary power unit 61 ("APU" shown in FIG. 9) may be shut down while the aircraft is being serviced, as previously noted, so that the fluids (and, particularly, the glycols) will not be ingested within the APU 61, thereby preventing potential damage to the APU 61 within the aircraft A. This is yet another feature and advantage of the present invention.

Figure 16:
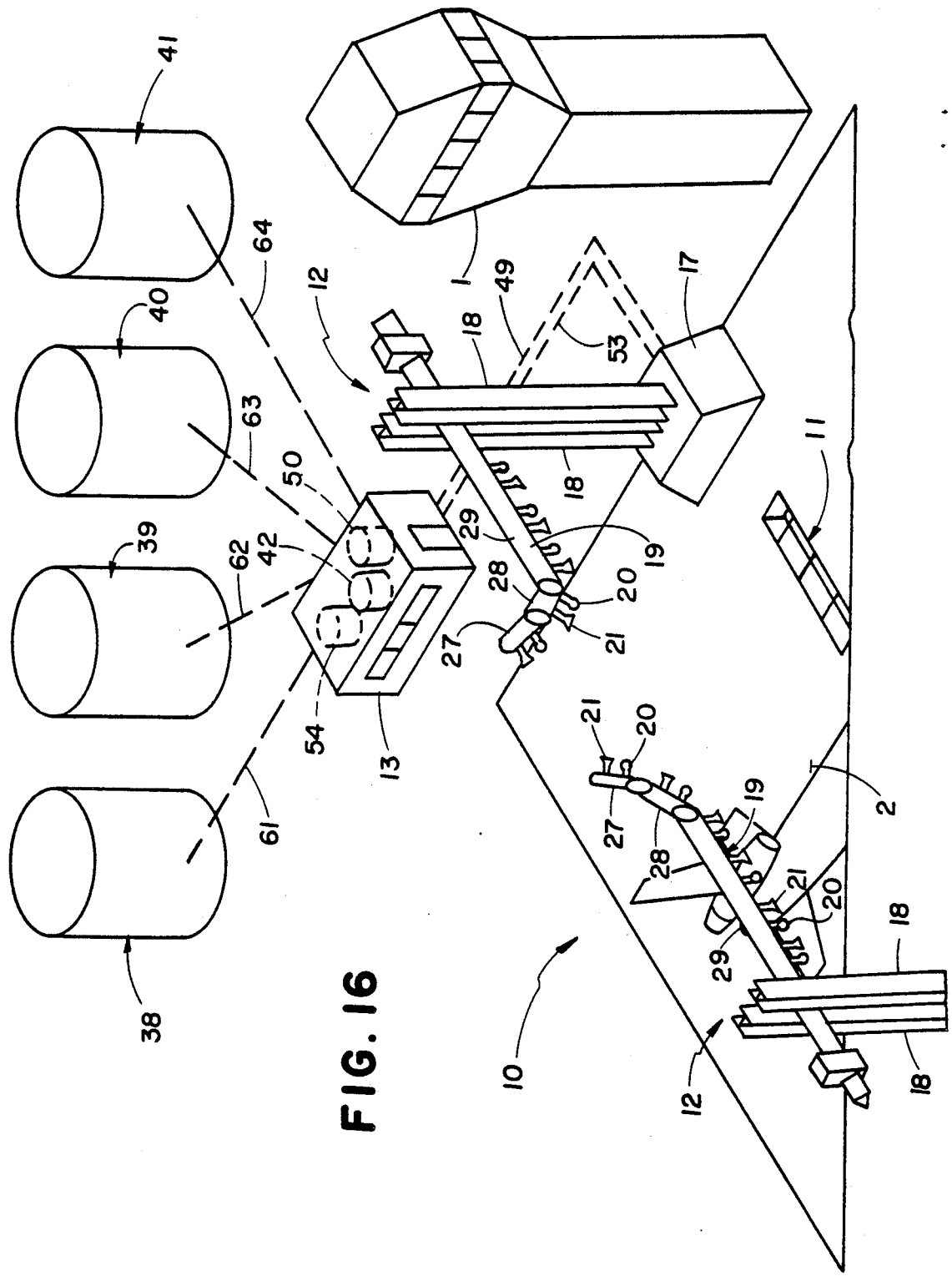

With reference to FIG. 16, the storage tanks 38, 39, 40 and 41 are connected to the equipment house 13 by underground conduits 61, 62, 63 and 64, respectively. The equipment house 13 contains the mixing tanks 42 and 51 and the settling tank 54 (as well as any other required mechanical equipment and instrumentation). The respective pressurized fluids are pumped via suitable underground conduits 49 and 53 (corresponding to the high-pressure and low-pressure side, respectively) to the upper units 12 having the articulatable booms 19 (and also to the lower units 11, now shown in FIG. 16). The underground conduits, being conventional, have been shown schematically for ease of illustration. In lieu of the storage tanks 38-41, tank trucks could be employed (if desired).

In summary, the present invention alleviates the disadvantages and deficiencies of the prior art by providing an apparatus and a method which has the following features and advantages: assures the highest standards of aviation safety even under very adverse weather conditions; increases aircraft "holdover" time; provides increased flexibility in airport operations; is rugged and reliable and easily maintained and serviced; is economical both from the initial capital investment as well as the on-going operating costs; preserves the environment by collecting and recycling the de-icing and anti-icing fluids; and avoids the necessity for using the engines-/APU of the aircraft as the aircraft is being serviced by the apparatus, thereby avoiding potential damage to the engines/APU by the ingestion of the fluids, especially the glycols. These are important features and advantages of the present invention, heretofore not available in the prior art.

Obviously, many modifications may be made without departing from the spirit of the present invention. For example, it will be appreciated by those skilled in the art that the apparatus and method of the present invention may be used equally as well for de-icing and anti-icing and/or cleaning and rinsing an aircraft. Accordingly, it will be appreciated by those skilled in the art that within the scope of the appended claims, the invention may be practiced other than has been specifically described herein.

What is claimed is:

1. An apparatus for both de-icing and anti-icing an aircraft in one pass of the aircraft through the apparatus, comprising a pair of units including at least one upper unit positioned above the aircraft and further including at least one lower unit disposed below the aircraft, each unit having respective first nozzles oriented in one direction for dispensing a de-icing pressurized fluid mixture onto the aircraft as the aircraft approaches the units, and each unit further having respective second nozzles oriented in an opposite direction for dispensing an anti-icing pressurized fluid mixture onto the aircraft as the aircraft moves away from the units, respective sources of pressurized fluid mixtures for both de-icing and anti-icing the aircraft, respectively, and means for conducting the respective pressurized fluid mixtures from the respective sources to the first and second nozzles, respectively, such that the aircraft is both de-iced and anti-iced in one pass of the aircraft through the apparatus.

2. A bi-directional apparatus for both de-icing and anti-icing an aircraft that passes therethrough in one pas in either a first direction or a second opposite direction, the apparatus comprising a pair of units disposed above the aircraft, each unit having respective nozzles oriented forwardly and rearwardly thereof for dispensing a de-icing pressurized fluid mixture onto the aircraft as the aircraft approaches the units in either, respectively, the first direction or the second opposite direction, each unit further having respective nozzles forwardly and rearwardly thereof for dispensing an anti-icing pressurized fluid mixture onto the aircraft as the aircraft moves away from the units in either, respectively, the first direction or the second opposite direction, first and second sources of pressurized fluid sources for de-icing and anti-icing, respectively, and means for selectively conducting the respective de-icing and anti-icing pressurized fluid mixtures from the first and second sources thereof, respectively, to the respective nozzles, whereby the aircraft is both de-iced and anti-iced in one pass through the apparatus and in either the first or second opposite directions.

3. An apparatus for both de-icing and anti-icing in one pass, an aircraft that moves therethrough in a first direction, the apparatus comprised of respective sources of fluid and air; a pair of units positioned so as to be substantially above and below the aircraft; each unit having a respective first bank of nozzles for dispensing a de-icing pressurized fluid mixture, at least a portion of the first bank of nozzles being oriented substantially towards the aircraft as the aircraft approaches the units in the first direction for de-icing the aircraft; each unit having a respective second bank of nozzles for dispensing an anti-icing pressurized fluid mixture, at least a portion of the second bank of nozzles being oriented substantially towards the aircraft as the aircraft moves away from the units in the first direction for anti-icing the aircraft; first and second sources of pressurized fluid mixtures for de-icing and anti-icing, respectively; and means for selectively providing fluid communication between the second source and the second bank of nozzles and between the second source and the second bank of nozzles, respectively, whereby the aircraft is both de-iced and anti-iced in one pass through the apparatus.

4. An apparatus for both de-icing and anti-icing in one pas, an aircraft that moves therethrough in a first direction, the apparatus comprised of respective sources of fluid and air; a pair of units positioned so as to be substantially above and below the aircraft; each unit having a respective first bank of nozzles for dispensing a de-icing pressurized fluid mixture, at least a portion of the first bank of nozzles being oriented substantially towards the aircraft as the aircraft approaches the units in the first direction for de-icing the aircraft; each unit having a respective second bank of nozzles for dispensing an anti-icing pressurized fluid mixture, at least a portion of the second bank of nozzles being oriented substantially towards the aircraft as the aircraft moves away from the units in the first direction for anti-icing the aircraft; first and second sources of pressurized fluid mixtures for de-icing and anti-icing, respectively; and means for selectively providing fluid communication between the first source and the first bank of nozzles and between the second source and the second bank of nozzles, respectively, whereby the aircraft is both de-iced and anti-iced in one pass through the apparatus, wherein each unit includes a lower unit positioned substantially horizontally below the aircraft, wherein each unit further includes an upper unit positioned substantially above the aircraft, each upper unit including a substantially vertical support and further including an elongated selectively-adjustable articulatable boom carried by the support, cantilevered thereon, and extending substantially horizontally therefrom, and wherein the first and second banks of nozzles of each upper unit are carried on the respective booms thereof and are oriented substantially downwardly, so as to selectively dispense the respective pressurized fluid mixtures onto the aircraft.

5. A bi-directional apparatus for both de-icing and anti-icing, in one pass, an aircraft that moves therethrough in either a first direction or in a second opposite direction, the apparatus comprised of respective sources of fluid and air; a pair of units positioned so as to be substantially above and below the aircraft; each unit having a respective first group of nozzles for dispensing a de-icing pressurized fluid mixture and a respective second bank of nozzles for dispensing an anti-icing pressurized fluid mixture; first and second respective sources of pressurized fluid pressure mixtures for de-icing and anti-icing, respectively, means for selectively providing fluid communication between the first and second sources and the first and second bank of nozzles, respectively; a first portion of the first bank of nozzles being oriented substantially towards the aircraft as the aircraft approaches the units in the first direction, and a second portion of the first bank of nozzles being oriented substantially towards the aircraft as the aircraft approaches the units in the second opposite direction for de-icing the aircraft as the aircraft approaches the units in either the first or the second opposite directions; and a first portion of the second bank of nozzles being oriented substantially towards the aircraft as the aircraft moves away from the units in the second opposite direction, and a second portion of the second bank of nozzles being oriented substantially towards the aircraft as the aircraft moves away from the units in the first direction for anti-icing the aircraft as the aircraft moves away from the units in either the first or the second opposite directions; whereby the aircraft may be both de-iced and anti-iced in one pass of the aircraft by movement of the aircraft in either the first direction or in the second opposite direction through the apparatus, so that the apparatus is bi-directional.

6. An apparatus for de-icing and anti-icing an aircraft that moves therethrough in a first direction, the apparatus comprising a pair of lower units being disposed substantially horizontally below the aircraft, said lower units further being disposed so as to be on opposite sides of the aircraft, each lower unit having a respective first bank of lower nozzles for dispensing a pressurized fluid mixtures for de-icing the aircraft, and further having a second bank of lower nozzles for dispensing a pressurized fluid mixture for anti-icing the aircraft, the first and second banks of lower nozzles being oriented substantially upwardly so as to selectively dispense the respective pressurized fluid mixtures onto the underside of the aircraft; a pair of upper units disposed substantially above the aircraft, said upper units further disposed on opposite sides of the aircraft, each upper unit having a respective first bank of upper nozzles for dispensing a pressurized fluid mixture for de-icing the aircraft, and further having a second bank of upper nozzles for dispensing a pressurized fluid mixture for anti-icing the aircraft, each upper unit including a substantially vertical support and an elongated substantially horizontal boom carried by the support, the first and second banks of upper nozzles of each upper unit being carried on the respective booms thereof and being oriented substantially downwardly, so as to selectively dispense the respective pressurized fluid mixtures onto the top surface of the aircraft wing and fuselage; first and second sources of pressurized fluid mixtures for de-icing and anti-icing, respectively, conduit means extending between the first source and the first bank of nozzles, and extending between the second source and the second bank of nozzles, respectively; a first portion of the first bank of upper nozzles and a first portion of the first bank of lower nozzles further being oriented substantially forwardly toward the aircraft as the aircraft approaches the upper and lower units in the first direction, such that as the aircraft approaches the upper and lower units in the first direction, the first portion of the first bank of upper and lower nozzles spray the aircraft with the first pressurized fluid mixture for de-icing the aircraft; and a second portion of the second bank of upper nozzles and a second portion of the second bank of lower nozzles further being oriented substantially rearwardly towards the aircraft as the aircraft moves away from the upper and lower units in the first direction, such that as the aircraft moves away from the upper and lower units in the first direction, the second portion of the second bank of upper and lower nozzles spray the aircraft with the second pressurized fluid mixture for anti-icing the aircraft; whereby the aircraft is both de-iced and anti-iced in one pass by movement of the aircraft in the first direction between the upper and lower units.

7. An apparatus for de-icing and anti-icing an aircraft that moves therethrough in a first direction, the apparatus comprising a pair of lower units being disposed substantially below the aircraft, said lower units further being disposed so as to be on opposite sides of the aircraft, each lower unit having a respective first bank of lower nozzles for dispensing a pressurized fluid mixture for de-icing the aircraft, and further having a second bank of lower nozzles for dispensing a pressurized fluid mixture for anti-icing the aircraft, the first and second banks of lower nozzles being oriented substantially upwardly so as to selectively dispense the respective pressurized fluid mixtures onto the underside of the aircraft; a pair of upper units disposed substantially above the aircraft, said upper units further disposed on opposite sides of the aircraft, each upper unit having a respective first bank of upper nozzles for dispensing a pressurized fluid mixture for de-icing the aircraft, and further having a second bank of upper nozzles for dispensing a pressurized fluid mixture for anti-icing the aircraft, each upper unit including a substantially vertical support and an elongated substantially horizontal boom carried by the support, the first and second banks of upper nozzles of each upper unit being carried on the respective booms thereof and being oriented substantially downwardly, so as to selectively dispense the respective pressurized fluid mixtures onto the top surface of the aircraft wing and fuselage; first and second sources of pressurized fluid mixtures for de-icing and anti-icing, respectively, conduit means extending between the first source and the first bank of nozzles, and extending between the second source and the second bank of nozzles, respectively; a first portion of the first bank of upper nozzles and a first portion of the first bank of lower nozzles further being oriented substantially forwardly toward the aircraft a the aircraft approaches the upper and lower units int eh first direction, such that as the aircraft approaches the upper and lower units in the first direction, the first portion of the first bank of upper and lower nozzles spray the aircraft with the first pressurized fluid mixture for de-icing the aircraft; and a second portion of the second bank of upper nozzles and a second portion of the second bank of lower nozzles further being oriented substantially rearwardly towards the aircraft as the aircraft moves away from the upper and lower units int he first direction, such that as the aircraft moves away from the upper and lower units in the first direction, the second portion of the second bank of upper and lower nozzles spray the aircraft with the second pressurized fluid mixture for anti-icing the aircraft; whereby the aircraft is both de-iced and anti-iced in one pass by movement of the aircraft in the first direction between the upper and lower units, wherein the aircraft may further move therethrough in a second direction being substantially opposite to the first direction, further comprising a second portion of the first bank of upper and lower nozzles being further oriented substantially rearwardly towards the aircraft as the aircraft approaches the upper and lower units in the second opposite direction, such that as the aircraft approaches the upper and lower units in the second opposite direction, the second portion of the first bank of upper and lower nozzles spray the aircraft with the first pressurized fluid mixture, thereby de-icing the aircraft; a first portion of the second bank of upper and lower nozzles being further oriented substantially forwardly towards the aircraft a the aircraft moves away from the upper and lower units in the second opposite direction, such that as the aircraft moves away from the upper and lower units in the second opposite direction, the first portion of the second bank of upper and lower nozzles spray the aircraft with the second pressurized fluid mixture, thereby anti-icing the aircraft; whereby the aircraft may be both de-iced and anti-iced in one pass of the aircraft by movement of the aircraft in either the first direction or in the second opposite direction between the upper and lower units, thereby providing a bi-directional apparatus for maximum efficiency and flexibility.

8. The apparatus of claim 7, wherein the first source of pressurized fluid mixture for de-icing the aircraft includes air, water and glycol; and wherein high-pressure pumps are provided for pumping the de-icing pressurized fluid mixture to the first banks of upper and lower nozzles.

9. The apparatus of claim 7, wherein the second source of pressurized fluid mixture for anti-icing the aircraft includes air, water and glycol; and wherein low-pressure pumps are provided for pumping the anti-icing pressurized fluid mixture to the second banks of upper and lower nozzles.

10. The apparatus of claim 7, wherein the booms are articulatable to accommodate aircraft of different configurations.

11. The apparatus of claim 10, wherein each boom comprises a plurality of arms pivotably connected to each other.

12. The apparatus of claim 7, wherein the booms are vertically adjustable to accommodate different aircraft heights.

13. An apparatus for de-icing and anti-icing an aircraft that moves therethrough in a first direction, the apparatus comprising a pair of lower units being disposed substantially horizontally below the aircraft, said lower units further being disposed so as to be on opposite sides of the aircraft, each lower unit having a respective first bank of lower nozzles for dispensing a pressurized fluid mixture for de-icing the aircraft, and further having a second bank of lower nozzles for dispensing a pressurized fluid mixture for anti-icing the aircraft, the first and second banks of lower nozzles being oriented substantially upwardly so as to selectively dispense the respective pressurized fluid mixtures onto the underside of the aircraft; a pair of upper units disposed substantially above the aircraft, said upper units further disposed on opposite sides of the aircraft, each upper unit having a respective first bank of upper nozzles for dispensing a pressurized fluid mixture for de-icing the aircraft, and further having a second bank of upper nozzles for dispensing a pressurized fluid mixture for anti-icing the aircraft, each upper unit including a substantially vertical support and an elongated substantially horizontal boom carried by the support, the first and second banks of upper nozzles of each upper unit being carried on the respective booms thereof and being oriented substantially downwardly, so as to selectively dispense the respective pressurized fluid mixtures onto the top surface of the aircraft wing and fuselage; first and second sources of pressurized fluid mixtures for de-icing and anti-icing, respectively, conduit means extending between the first source and the first bank of nozzles, and extending between the second source and the second bank of nozzles, respectively; a first portion of the first bank of upper nozzles and a first portion of the first bank of lower nozzles further being oriented substantially forwardly toward the aircraft as the aircraft approaches the upper and lower units in the first direction, such that as the aircraft approaches the upper and lower units in the first direction, the first portion of the first bank of upper and lower nozzles spray the aircraft with the first pressurized fluid mixture for de-icing the aircraft; and a second portion of the second bank of upper nozzles and a second portion of the second bank of lower nozzles further being oriented substantially rearwardly towards the aircraft as the aircraft moves away from the upper and lower units int he first direction, such that as the aircraft moves away from the upper and lower units in the first direction, the second portion of the second bank of upper and lower nozzles spray the aircraft with the second pressurized fluid mixture for anti-icing the aircraft; whereby the aircraft is both de-iced and anti-iced in one pass by movement of the aircraft in the first direction between the upper and lower units wherein appropriate glycols are included in the first and second pressurized fluid mixtures, and wherein means are provided for collecting the run-off of the glycol dispensed by the nozzles for subsequent recycling of said glycols.

14. An apparatus for de-icing and anti-icing an aircraft that moves therethrough in a first direction, the apparatus comprising a pair of lower units positioned substantially horizontally below the aircraft, said lower units further being positioned so as to be on opposite sides of the aircraft, each lower unit having a respective first bank of lower nozzles for dispensing a first pressurized fluid mixture for de-icing the aircraft, and further having a second bank of lower nozzles for dispensing a second pressurized fluid mixture for anti-icing the aircraft, the first and second banks of lower nozzles being oriented substantially upwardly so as to selectively dispense the respective first and second pressurized fluid mixtures onto the underside of the aircraft; a pair of upper units positioned so as to be substantially above the aircraft, said upper units further being positioned so as to be on opposite sides of the aircraft, each upper unit having a respective first bank of upper nozzles for dispensing the first pressurized fluid mixture for de-icing the aircraft, and further having a second bank of upper nozzles for dispensing the second pressurized fluid mixture for anti-icing the aircraft, each upper unit including a substantially vertical support and an elongated substantially horizontal boom carried by the support, cantilevered thereon, and extending horizontally therefrom, the first and second banks of upper nozzles of each upper unit being carried on the respective booms thereof and being oriented substantially downwardly, so as to selectively dispense the first and second pressurized fluid mixtures, respectively, on the top surfaces of the wings and fuselage of the aircraft; first and second sources of the first and second pressurized fluid mixtures; a plurality of conduits extending between the first and second nozzles and the first and second sources, respectively, and providing for fluid communication therebetween; a first portion of the first bank of upper nozzles and a first portion of the first bank of lower nozzles further being oriented substantially forwardly toward the aircraft as the aircraft approaches the upper and lower units in the first direction, such that as the aircraft approaches the upper and lower units in the first direction, the first portion of the first bank of upper and lower nozzles spray the aircraft with the first pressurized fluid mixture, thereby de-icing the aircraft; and a second portion of the second bank of upper nozzles and a second portion of the second bank of lower nozzles further being oriented substantially rearwardly towards the aircraft as the aircraft moves away from the upper and lower units in the first direction, such that as the aircraft moves away from the upper and lower units in the first direction, the second portion of the second bank of upper and lower nozzles spray the aircraft with the second pressurized fluid mixture, thereby anti-icing the aircraft; whereby the aircraft is both de-iced and anti-iced in one pass by movement of the aircraft in the first direction between the upper and lower units; wherein the first source is provided with high pressure pumps, and wherein the second source is provided with low pressure pumps.

15. An apparatus for de-icing and anti-icing an aircraft that moves therethrough in a first direction, the apparatus comprised of: a pair of lower units positioned substantially horizontally below the aircraft, said lower units further positioned so as to be on opposite sides of the aircraft, each lower unit having a respective first bank of lower nozzles for dispensing pressurized air/water for de-icing the aircraft and a second bank of lower nozzles for dispensing pressurized glycol/water for anti-icing the aircraft, the first and second groups of lower nozzles being oriented substantially upwardly so as to selectively dispense the pressurized air/water or glycol/water onto the underside of the aircraft; a pair of upper units positioned, so as to be substantially above the aircraft, said upper units further positioned, so as to be on opposite sides of the aircraft, each upper unit having a respective first bank of upper nozzles for dispensing pressurized air/water for de-icing the aircraft, each upper unit having a respective first bank of upper nozzles for dispensing pressurized air/water for de-icing the aircraft and a second bank of upper nozzles for dispensing pressurized glycol/water for anti-icing the aircraft, each upper unit including a substantially vertical support and an elongated substantially horizontal boom carried by the support, such that a tower is defined thereby, the first and second banks of upper nozzles of each upper unit being carried on the respective booms thereof being oriented substantially downwardly, so as to selectively dispense the pressurized air/water or glycol/water onto the top side of the aircraft; respective sources of water, air and glycol; a plurality of conduits extending between the nozzles and the sources of air, water and glycol, so as to provide for fluid communication between the respective sources and the respective nozzles; means for pressurizing the air, water and glycol, such that pressurized air, water and glycol are moved through the conduits from the respective sources to the nozzles and are dispensed from the respective nozzles for de-icing and anti-icing the aircraft; a first portion of the first bank of upper nozzles and a first portion of the first bank of lower nozzles further being oriented substantially forwardly toward the aircraft as it approaches the upper and lower units in the first direction, such that as the aircraft approaches the upper and lower units in the first direction, the first portion of the first bank of upper and lower nozzles spray the aircraft with air/water, thereby de-icing the aircraft; and a second portion of the second bank of upper nozzles and a second portion of the second bank of lower nozzles further being oriented substantially rearwardly towards the aircraft as it moves away from the upper and lower units in the first direction, the second portion of the second bank of upper and lower nozzles spray the aircraft with glycol/water, thereby anti-icing the aircraft; whereby the aircraft is both de-iced and anti-iced in one pass by movement of the aircraft in the first direction between the upper and lower units; wherein the means for pressurizing the air, water and glycol includes high pressure pumps for providing high pressure air/water to the respective first banks of upper and lower nozzles; wherein the means for pressurizing the air, water and glycol further includes low pressure pumps for providing low pressure glycol/water to the respective second banks of upper and lower nozzles; and means for collecting the glycol and water dispensed by the nozzles and for distilling and recycling the glycol and water for the further use thereof.

16. An arrangement for de-icing and anti-icing an aircraft that moves therethrough in a first direction, the arrangement comprised of: a pair of lower units positioned substantially horizontally below the aircraft, said lower units further positioned so as to be on opposite sides of the aircraft, each lower unit having a respective first bank of lower nozzles for dispensing pressurized air/water for de-icing the aircraft and a second bank of lower nozzles for dispensing pressurized glycol/water for anti-icing the aircraft, the first and second banks of lower nozzles being oriented substantially upwardly so as to selectively dispense the pressurized air/water or glycol/water onto the underside of the aircraft; a pair of upper units positioned, so as to be substantially above the aircraft, said upper units further positioned, so as to be on opposite sides of the aircraft, each upper unit having a respective first bank of upper nozzles for dispensing pressurized air/water for de-icing the aircraft and a second bank of upper nozzles for dispensing pressurized glycol/water for anti-icing the aircraft, each upper unit including a substantially vertical support and an elongated substantially horizontal boom movably carried by the support, so that the location of the boom may be adjusted along the substantially vertical support, such that a tower is defined thereby, the first and second banks of upper nozzles of each upper unit being carried on the respective booms thereof being oriented substantially downwardly, so as to selectively dispense the pressurized air/water or glycol/water onto the top side of the aircraft; the booms of the respective upper units including at least one joint, so that at least a portion of the boom is pivotably moveable upwardly and downwardly relative to the joint for adjusting the direction in which the nozzles carried thereon dispense the air/water or the glycol/water therefrom; and further wherein the respective upper units and lower units are movable, such that the upper units and the lower units can be positioned to correspond to the cross-section silhouette of the aircraft as moved along the entire length of the aircraft travels through the device; respective sources of water, air and glycol; a plurality of conduits extending between the nozzles and the sources of air, water and glycol, so as to provide for fluid communication between the respective sources and the respective nozzles; means for pressurizing the air, water and glycol, such that pressurized air, water and glycol are moved through the conduits from the respective sources to the nozzles and are dispensed from the respective nozzles for de-icing and anti-icing the aircraft; a first portion of the first group of upper nozzles and a first portion of the first group of lower nozzles further being oriented substantially forwardly toward the aircraft as it approaches the upper and lower units in the first direction, such that as the aircraft approaches the upper and lower units in the first direction, the first portion of the first bank of upper and lower nozzles spray the aircraft with air/water, thereby de-icing the aircraft; and a second portion of the second bank of upper nozzles and a second portion of the second bank of lower nozzles further being oriented substantially rearwardly towards the aircraft as it moves away from the upper and lower units in the first direction, such that as the aircraft moves away from the upper and lower units int he first direction, the second portion of the second bank of upper and lower nozzles spray the aircraft with glycol/water, thereby anti-icing the aircraft; whereby the aircraft is both de-iced and anti-iced in one pass by movement of the aircraft in the first direction between the upper and lower units; wherein the means for pressurizing the air, water and glycol includes high pressure pumps for providing high pressure air/water to the respective first banks groups of upper and lower nozzles; wherein the means for pressurizing the air, water and glycol further includes low pressure pumps for providing low pressure glycol/water to the respective second banks groups of upper and lower nozzles; and means for collecting the glycol and water dispensed by the nozzles and for distilling and recycling the glycol and water for the further use thereof.

17. A bi-directional arrangement for de-icing and anti-icing an aircraft that moves therethrough in either a first direction or a second opposite direction, the arrangement comprised of:

a pair of lower units positioned substantially horizontally below the aircraft, said lower units further positioned so as to be on opposite sides of the aircraft, each lower unit having a respective first bank of lower nozzles for dispensing pressurized air/water for de-icing the aircraft and a second bank of lower nozzles for dispensing pressurized glycol/water for anti-icing the aircraft, the first and second banks of lower nozzles being oriented substantially upwardly so as to selectively dispense the pressurized air/water or glycol/water onto the underside of the aircraft;

a pair of upper units positioned, so as to be substantially above the aircraft, said upper units further positioned, so as to be an opposite sides of the aircraft, each upper unit having a respective first bank of upper nozzles for dispensing pressurized air/water for de-icing the aircraft and a second bank of upper nozzles for dispensing pressurized glycol/water for anti-icing the aircraft, each upper unit including a substantially vertical support and an elongated substantially horizontal boom carried by the support, such that a tower is defined thereby, the first and second banks of upper nozzles of each upper unit being carried on the respective booms thereof being oriented substantially downwardly, so as to selectively dispense the pressurized air/water or glycol/water onto the top side of the aircraft;

respective sources of water, air and glycol;

a plurality of conduits extending between the nozzles and the sources of air, water and glycol, so as to provide for fluid communication between the respective sources and the respective nozzles;

means for pressurizing the air, water and glycol, such that pressurized air, water and glycol are moved through the conduits from the respective sources to the nozzles and are dispensed from the respective nozzles for de-icing and anti-icing the aircraft, said means including high pressure pumps for providing high pressure air/water to the respective first banks of upper and lower nozzles, and said means further including low pressure pumps for providing low pressure glycol/water to the respective second banks of upper and lower nozzles;

a first portion of the first bank of upper nozzles and a first portion of the first bank of lower nozzles further being oriented substantially forwardly toward the aircraft as it approaches the upper and lower units in the first direction, such that as the aircraft approaches the upper and lower units in the first direction, the first portion of the first bank of upper and lower nozzles spray the aircraft with air/water, thereby de-icing the aircraft; and a second portion of the second bank of upper nozzles and a second portion of the second bank of lower nozzles further being oriented substantially rearwardly towards the aircraft as it moves away from the upper and lower units in the first direction, such that as the aircraft moves away from the upper and lower units in the first direction, the second portion of the second bank of upper and lower nozzles spray the aircraft with glycol/water, thereby anti-icing the aircraft;

whereby the aircraft is both de-iced and anti-iced in one pass by movement of the aircraft in the first direction between the upper and lower units;

second portion of the first bank of upper and lower nozzles are further oriented substantially rearwardly towards the aircraft as it approaches the upper and lower units in the second opposite direction, such that as the aircraft approaches the upper and lower units in the second opposite direction, the second portion of the first bank of upper and lower nozzles spray the aircraft with air/water, thereby de-icing the aircraft;

a first portion of the second bank of upper and lower nozzles are further oriented substantially forwardly towards the aircraft as it moves away from the upper and lower units in the second opposite direction towards the aircraft as it moves away from the upper and lower units in the second opposite direction, such that as the aircraft moves away from the upper and lower units in the second opposite direction, the first portion of the second bank of upper and lower nozzles spray the aircraft with glycol/water, thereby anti-icing the aircraft;

whereby the aircraft may be both de-iced and anti-iced in one pass of the aircraft by movement of the aircraft in either the first direction or in the second opposite direction between the upper and lower units, so that the arrangement is bi-directional.

18. A bi-directional apparatus for de-icing and anti-icing an aircraft that moves therethrough in either a first direction of a second opposite direction, the apparatus comprised of: a pair of lower units positioned substantially horizontally below the aircraft, said lower units further positioned so as to be on opposite sides of the aircraft, each lower unit having a respective first bank of lower nozzles for dispensing pressurized air/water for de-icing the aircraft and a second bank of lower nozzles for dispensing pressurized glycol/water for anti-icing the aircraft, the first and second groups of lower nozzles being oriented substantially upwardly so as to selectively dispense the pressurized air/water or glycol/water onto the underside of the aircraft; a pair of upper units positioned, so as to be substantially above the aircraft, said upper units further positioned, so as to be on opposite sides of the aircraft, each upper unit having a respective first bank of upper nozzles for dispensing pressurized air/water for de-icing the aircraft and a second bank of upper nozzles for dispensing pressurized glycol/water for anti-icing the aircraft, each upper unit including a substantially vertical support and an elongated substantially horizontal boom carried by the support, such that a tower is defined thereby, the first and second banks of upper nozzles of each upper unit being carried on the respective booms thereof being oriented substantially downwardly, so as to selectively dispense the pressurized air/water or glycol/water onto the top side of the aircraft; respective sources of water, air and glycol; a plurality of conduits extending between the nozzles and the sources of air, water and glycol, so as to provide for fluid communication between the respective sources and the respective nozzles; means for pressurizing the air, water and glycol, such that pressurized air, water and glycol are moved through the conduits from the respective sources to the nozzles and are dispensed from the respective nozzles for de-icing and anti-icing the aircraft, said means including high pressure pumps for providing high pressure air/water to the respective first banks of upper and lower nozzles, and said means further including low pressure pumps for providing low pressure glycol/water to the respective second banks of upper and lower nozzles; means for collecting the glycol and water dispensed by the nozzles and for distilling and recycling the glycol and water for the further use thereof; a first portion of the first bank of upper nozzles and a first portion of the first bank of lower nozzles further being oriented substantially forwardly toward the aircraft as it approaches the upper and lower units in the first direction, such that as the aircraft approaches the upper and lower units in the first direction, the first portion of the first bank of upper and lower nozzles spray the aircraft with air/water, thereby de-icing the aircraft; and a second portion of the second bank of upper nozzles and a second portion of the second bank of lower nozzles further being oriented substantially rearwardly towards the aircraft as it moves away from the upper and lower units in the first direction, such that as the aircraft moves away from the upper and lower units in the first direction, the second portion of the second bank of upper and lower nozzles spray the aircraft with glycol/water, thereby anti-icing the aircraft; whereby the aircraft is both de-iced and anti-iced in one pass by movement of the aircraft in the first direction between the upper and lower units; a second portion of the first bank of upper and lower nozzles are further oriented substantially rearwardly towards the aircraft as it approaches the upper and lower units int he second opposite direction, such that as the aircraft approaches the upper and lower units in the second opposite direction, the second portion of the first bank of upper and lower nozzles spray the aircraft with air/water, thereby de-icing the aircraft; a first portion of the second bank of upper and lower nozzles are further oriented substantially forwardly towards the aircraft as it moves away from the upper and lower units in the second opposite direction towards the aircraft as it moves away from the upper and lower units in the second opposite direction, such that as the aircraft moves away from the upper and lower units in the second opposite direction, the first portion of the second bank of upper and lower nozzles spray the aircraft with glycol/water, thereby anti-icing the aircraft; whereby the aircraft may be both de-iced and anti-iced in one pas of the aircraft by movement of the aircraft in either the first direction or in the second opposite direction between the upper and lower units, so that the arrangement is bi-directional.

19. A bi-directional apparatus for de-icing and anti-icing an aircraft that moves therethrough in either a first direction or a second opposite direction, the apparatus comprised of: a pair of lower units positioned substantially horizontally below the aircraft, said lower units further positioned so as to be on opposite sides of the aircraft, each lower unit having a respective first bank of lower nozzles for dispensing pressurized air/water for de-icing the aircraft and a second group of lower nozzles for dispensing pressurized glycol/water for anti-icing the aircraft, the first and second banks of lower nozzles being oriented substantially upwardly so as to selectively dispense the pressurized air/water or glycol/water onto the underside of the aircraft; a pair of upper units positioned, so as to be substantially above the aircraft, said upper units further positioned, so as to be on opposite sides of the aircraft, each upper unit having a respective first bank of upper nozzles for dispensing pressurized air/water for de-icing the aircraft and a second bank of upper nozzles for dispensing pressurized glycol/water for anti-icing the aircraft, each upper unit including a substantially vertical support and an elongated substantially horizontal boom movably carried by the supports, so that the location of the booms may be adjusted along the substantially vertical supports, such that a tower is defined thereby, the first and second banks of upper nozzles of each upper unit being carried on the respective booms thereof being oriented substantially downwardly, so as to selectively dispense the pressurized air/water or glycol/water onto the top side of the aircraft; the booms of the respective upper units further including at least one joint, so that at least a portion of the boom is pivotably moveable upwardly and downwardly relative to the joint for adjusting the direction in which the nozzles carried thereon dispense the air/water or the glycol/water therefrom; the respective upper units and lower units being movable, such that the upper units and the lower units can be positioned to correspond to the cross-section silhouette of the aircraft as the entire length of the aircraft travels through the device; respective sources of water, air and glycol; a plurality of conduits extending between the nozzles and the sources of air, water and glycol, so as to provide for fluid communication between the respective sources and the respective nozzles; means for pressurizing the air, water and glycol, such that pressurized air, water and glycol are moved through the conduits from the respective sources to the nozzles and are dispensed from the respective nozzles for de-icing and anti-icing the aircraft, said means including high pressure pumps for providing high pressure air/water to the respective first banks of upper and lower nozzles, and said means further including low pressure pumps for providing low pressure glycol/water to the respective second banks of upper and lower nozzles; means for collecting the glycol and water dispensed by the nozzles and for distilling and recycling the glycol and water for the further use thereof; a first portion of the first bank of upper nozzles and a first portion of the first bank of lower nozzles further being oriented substantially forwardly toward the aircraft as it approaches the upper and lower units in the first direction, such that as the aircraft approaches the upper and lower units in the first direction, the first portion of the first bank of upper and lower nozzles spray the aircraft with air/water, thereby de-icing the aircraft; and a second portion of the second bank of upper nozzles and a second portion of the second bank of lower nozzles further being oriented substantially rearwardly towards the aircraft as it moves away from the upper and lower units in the first direction, such that as the aircraft moves away from the upper and lower units in the first direction, the second portion of the second bank of upper and lower nozzles spray the aircraft with glycol/water, thereby anti-icing the aircraft; whereby the aircraft is both de-iced and anti-iced in one pass by movement of the aircraft in the first direction between the upper and lower units; a second portion of the first bank of upper and lower nozzles are further oriented substantially rearwardly towards the aircraft as it approaches the upper and lower units in the second opposite direction, such that as the aircraft approaches the upper and lower units in the second opposite direction, the second portion of the first bank of upper and lower nozzles spray the aircraft with air/water, thereby de-icing the aircraft; a first portion of the second bank of upper and lower nozzles are further oriented substantially forwardly towards the aircraft as it moves away from the upper and lower units in the second opposite direction towards the aircraft as it moves away from the upper and lower units in the second opposite direction, such that as the aircraft moves away from the upper and lower units in the second opposite direction, the first portion of the second bank of upper and lower nozzles spray the aircraft with glycol/water, thereby anti-icing the aircraft; whereby the aircraft may be both de-iced and anti-iced in one pass of the aircraft by movement of the aircraft in either the first direction of in the second opposite direction between the upper and lower units, so that the arrangement is bi-directional.

20. An apparatus for de-icing and anti-icing an aircraft that moves therethrough in a first direction, the apparatus comprised of: a pair of lower units positioned substantially horizontally below the aircraft, said lower units further positioned so as to be on opposite sides of the aircraft, each lower unit having a respective first bank of lower nozzles for dispensing a pressurized fluid de-icing composition for de-icing the aircraft and a second bank of lower nozzles for dispensing a pressurized fluid anti-icing composition for anti-icing the aircraft, the first and second banks of lower nozzles being oriented substantially upwardly so as to selectively dispense the pressurized de-icing or anti-icing compositions onto the underside of the aircraft; a pair of upper units positioned, so as to be substantially above the aircraft, said upper units further positioned, so as to be on opposite sides of the aircraft, each upper unit having a respective first bank of upper nozzles for dispensing the pressurized de-icing composition for de-icing the aircraft and a second bank of upper nozzles for dispensing the pressurized anti-icing composition for anti-icing the aircraft, each upper unit including a substantially vertical support and an elongated substantially horizontal boom carried by the support, such that a tower is defined thereby, the first and second banks of upper nozzles of each upper unit being carried on the respective booms thereof being oriented substantially downwardly, so as to selectively dispense the pressurized de-icing or anti-icing compositions onto the top side of the aircraft; respective sources of fluid de-icing and fluid anti-icing compositions; a plurality of conduits extending between the nozzles and the sources of the de-icing and anti-icing compositions, so as to provide for fluid communication between the respective sources and the respective nozzles; means for pressurizing the de-icing and anti-icing compositions, such that pressurized de-icing and anti-icing compositions are moved through the conduits from the respective sources to the nozzles and are dispensed from the respective nozzles for de-icing and anti-icing the aircraft; a first portion of the first bank of upper nozzles and a first portion of the first bank of lower nozzles further being oriented substantially forwardly toward the aircraft as it approaches the upper and lower units in the first direction, such that as the aircraft approaches the upper and lower units in the first direction, the first portion of the first bank of upper and lower nozzles spray the aircraft with the pressurized de-icing composition, thereby de-icing the aircraft; and a second portion of the second bank of upper nozzles and a second portion of the second bank of lower nozzles further being oriented substantially rearwardly towards the aircraft as it moves away from the upper and lower units in the first direction, such that as the aircraft moves away from the upper and lower units in the first direction, the second portion of the second group of upper and lower nozzles spray the aircraft with the pressurized anti-icing composition, thereby anti-icing the aircraft; whereby the aircraft is both de-iced and anti-iced in one pass by movement of the aircraft in the first direction between the upper and lower units.

21. A bi-directional apparatus for de-icing and anti-icing an aircraft that moves therethrough in either a first direction or a second opposite direction, the apparatus comprised of: a pair of lower units positioned substantially horizontally below the aircraft, said lower units further positioned so as to be on opposite sides of the aircraft, each lower unit having a respective first bank of lower nozzles for dispensing a pressurized fluid de-icing composition for de-icing the aircraft and a second bank of lower nozzles for dispensing a pressurized fluid anti-icing composition for anti-icing the aircraft, the first and second banks of lower nozzles being oriented substantially upwardly so as to selectively dispense the pressurized de-icing or anti-icing compositions onto the underside of the aircraft; a pair of upper units positioned, so as to be substantially above the aircraft, said upper units further positioned, so as to be substantially above the aircraft, said upper units further positioned, so as to be on opposite sides of the aircraft, each upper unit having a respective first bank of upper nozzles for dispensing the pressurized de-icing composition for de-icing the aircraft and a second bank of upper nozzles for dispensing the pressurized anti-icing composition for anti-icing the aircraft, each upper unit including a substantially vertical support and an elongated substantially horizontal boom carried by the support, such that a tower is defined thereby, the first and second banks of upper nozzles of each upper unit being carried on the respective booms thereof being oriented substantially downwardly, so as to selectively dispense the pressurized de-icing or anti-icing compositions onto the top side of the aircraft; respective sources of fluid de-icing and fluid anti-icing compositions; a plurality of conduits extending between the nozzles and the sources of the de-icing and anti-icing compositions, so as to provide for fluid communication between the respective sources and the respective nozzles; means for pressurizing the de-icing and anti-icing compositions, such that pressurized de-icing and anti-icing compositions are moved through the conduits from the respective sources to the nozzles and are dispensed from the respective nozzles for de-icing and anti-icing the aircraft; a first portion of the first bank of upper nozzles and a first portion of the first bank of lower nozzles further being oriented substantially forwardly toward the aircraft as it approaches the upper and lower units in the first direction, such that as the aircraft approaches the upper and lower units in the first direction, the first portion of the first bank of upper and lower nozzles spray the aircraft with the pressurized de-icing composition, thereby de-icing the aircraft; and a second portion of the second bank of upper nozzles and a second portion of the second bank of lower nozzles further being oriented substantially rearwardly towards the aircraft as it moves away from the upper and lower units in the first direction, such that as the aircraft moves away from the upper and lower units in the first direction, the second portion of the second group of upper and lower nozzles spray the aircraft with the pressurized anti-icing composition, thereby anti-icing the aircraft; whereby the aircraft is both de-iced and anti-iced in one pass by movement of the aircraft in the first direction between the upper and lower units; a second portion of the first bank of upper and lower nozzles are further oriented substantially rearwardly towards the aircraft as it approaches the upper and lower units in the second opposite direction, such that as the aircraft approaches the upper and lower units in the second opposite direction, the second portion of the first bank of upper and lower nozzles spray the aircraft with the pressurized de-icing composition, thereby de-icing the aircraft; a first portion of the second bank of upper and lower nozzles are further oriented substantially forwardly towards the aircraft as it moves away from the upper and lower units in the second opposite direction, such that as the aircraft moves away from the upper and lower units in the second opposite direction, the first portion of the second bank of upper and lower nozzles spray the aircraft with the pressurized anti-icing composition, thereby anti-icing the aircraft; whereby the aircraft may be both de-iced and anti-iced in one pass of the aircraft by movement of the aircraft in either the first direction or in the second opposite direction between the upper and lower units, so that the arrangement is bi-directional.

22. A bi-directional apparatus for de-icing and anti-icing an aircraft in a two-step one-pass operation, comprising at least one boom having a forward portion and a rearward portion, high-pressure nozzles mounted on the forward and rearward portions of the boom, low pressure nozzles mounted on the forward and rearward portions of the boom and interspersed with the high-pressure nozzles thereon, a first source of a pressurized fluid mixture for de-icing the aircraft, a second source of a pressurized fluid mixture for anti-icing the aircraft, first means for selectively connecting the first source to the first nozzles, and second means for selectively connecting the second source to the second nozzles.

23. A single integrated apparatus for de-icing and anti-icing an aircraft, comprising first high-pressure means for spraying a first pressurized fluid mixture including a de-icing fluid on the aircraft as the aircraft enters into the apparatus, second low-pressure means for spraying a second pressurized fluid mixture including an anti-icing fluid on the aircraft as the aircraft leaves the apparatus, so that the aircraft may be both de-iced and anti-iced, respectively, in one "pass" of the aircraft relative to the single integrated apparatus, third means for selectively cycling respective portions of the first and second means, thereby conserving the de-icing and anti-icing fluids as the aircraft is progressively de-iced and anti-iced by the apparatus, and means for collecting and recycling the de-icing and anti-icing fluids.

24. In an aircraft for de-icing and anti-icing an aircraft, the combination of respective substantially horizontal articulatable booms disposed over the wings and at least a portion of the fuselage of the aircraft and on respective sides of the aircraft, means for raising and lowering the booms relative to the aircraft, thereby accommodating various aircraft heights, each boom having a plurality of arms pivotably mounted to each other, such that the booms may be adjusted to accommodate various aircraft configurations, first high-pressure nozzles carried on each boom for spraying a first pressurized fluid mixture including a de-icing fluid onto the aircraft, second low-pressure nozzles carried on each boom for spraying a second pressurized fluid mixture including an anti-icing fluid onto the aircraft, the first and second nozzles being arranged in respective nozzle groups including a first nozzle group and a second nozzle group, and means for selectively actuating the nozzles in each nozzle group depending upon the wingspan of the aircraft being serviced, so that only the nozzles necessary for proper coverage are operated, thereby conserving the de-icing and anti-icing fluids.

25. The method of de-icing and anti-icing an aircraft comprising the steps of providing a stationary apparatus through which the aircraft moves, the apparatus including respective nozzle means, spraying a first relatively high-pressure first pressurized air/fluid mixture simultaneously and through the same nozzle means onto selected surfaces of the aircraft in a progressive sequence, such that successive portions of the aircraft surfaces are de-iced, and such that portions of the aircraft surfaces have respective adjacent surfaces which receive a spray pattern overlay, in sequence, so that the de-icing process is successively reinforced along the aircraft surfaces; and second anti-icing the previously de-iced surfaces of the aircraft by spraying a relatively low-pressure second pressurized glycol/water eutectic fluid mixture onto the de-iced surfaces, thereby laying down an anti-icing coating thereon as remaining portions of the aircraft surfaces are being de-iced, and collecting the run-off of the first and second fluid mixtures for subsequent recycling wherein the aircraft is progressively de-iced and anti-iced in one pass of the aircraft relative to the apparatus.

* * * * *